US011362498B2

(12) United States Patent
Liubakka

(10) Patent No.: US 11,362,498 B2
(45) Date of Patent: Jun. 14, 2022

(54) APPARATUS FOR PRODUCING DIFFERENT SIZED BOXES

(71) Applicant: Glenn Liubakka, Pine City, MN (US)

(72) Inventor: Glenn Liubakka, Pine City, MN (US)

(*) Notice: Subject to any disclaimer, the term of this patent is extended or adjusted under 35 U.S.C. 154(b) by 344 days.

(21) Appl. No.: 16/292,183

(22) Filed: Mar. 4, 2019

(65) Prior Publication Data

US 2019/0305537 A1  Oct. 3, 2019

Related U.S. Application Data

(63) Continuation-in-part of application No. 15/496,971, filed on Apr. 25, 2017, now Pat. No. 10,840,683.

(60) Provisional application No. 62/326,974, filed on Apr. 25, 2016.

(51) Int. Cl.
| | |
|---|---|
| *B65D 63/10* | (2006.01) |
| *F16L 5/02* | (2006.01) |
| *H02G 1/06* | (2006.01) |
| *H02G 1/08* | (2006.01) |
| *H02G 3/04* | (2006.01) |
| *H02G 3/06* | (2006.01) |
| *H02G 3/08* | (2006.01) |
| *H02G 3/32* | (2006.01) |
| *H02G 3/18* | (2006.01) |

(52) U.S. Cl.
CPC ......... *H02G 3/085* (2013.01); *B65D 63/1027* (2013.01); *F16L 5/027* (2013.01); *H02G 1/06* (2013.01); *H02G 1/08* (2013.01); *H02G 3/0406* (2013.01); *H02G 3/0456* (2013.01); *H02G 3/0481* (2013.01); *H02G 3/06* (2013.01); *H02G 3/0616* (2013.01); *H02G 3/086* (2013.01); *H02G 3/32* (2013.01); *H02G 3/18* (2013.01)

(58) Field of Classification Search
CPC ..... B65D 63/1027; B65D 63/10; F16L 5/027; F16L 5/02; H02G 1/06; H02G 1/08; H02G 3/0406; H02G 3/0456; H02G 3/0481; H02G 3/06; H02G 3/0616; H02G 3/08; H02G 3/083; H02G 3/085; H02G 3/086; H02G 3/126; H02G 3/32; H02G 3/386; H02G 3/0418; H02G 3/18; H02G 3/04
USPC ..................... 174/50, 65 R, 66, 48; 220/3.2
See application file for complete search history.

(56) References Cited

U.S. PATENT DOCUMENTS

| | | | |
|---|---|---|---|
| 2,900,436 A | 8/1959 | Appleton | |
| 3,285,551 A | 11/1966 | Tschanz | |
| 3,684,220 A | 8/1972 | Logsdon | |
| 3,918,667 A | 11/1975 | Madden | |

(Continued)

FOREIGN PATENT DOCUMENTS

| | | | | |
|---|---|---|---|---|
| EP | 1365492 A1 | * | 11/2003 | ............ H02G 3/086 |
| WO | WO-2017037318 A1 | * | 3/2017 | ............ H02G 3/083 |

OTHER PUBLICATIONS

PCT/US2020/021013, "International Search Report and Written Opinion", dated Jul. 27, 2020, 23 pages.

*Primary Examiner* — Timothy J Thompson
*Assistant Examiner* — Guillermo J Egoavil
(74) *Attorney, Agent, or Firm* — Billion & Armitage

(57) ABSTRACT

The present invention provides a base electrical box, and an end portion. The end portion is added to the base electrical box to substantially complete the electrical box. The electrical box also includes at least one intermediate portion that is added to complete the electrical box. The at least one intermediate portion is placed between the base electric box and the end portion.

13 Claims, 26 Drawing Sheets

(56) References Cited

U.S. PATENT DOCUMENTS

| | | |
|---|---|---|
| 3,979,093 A | 9/1976 | Madden |
| 4,237,667 A | 12/1980 | Jarosz et al. |
| 4,440,425 A | 4/1984 | Pate et al. |
| 4,711,472 A | 12/1987 | Schnell |
| 5,072,072 A | 12/1991 | Bawa et al. |
| 5,090,644 A | 2/1992 | Lenker |
| 5,132,493 A | 7/1992 | Sheehan |
| 5,204,499 A | 4/1993 | Favalora |
| 5,248,850 A | 9/1993 | Laney |
| 5,276,280 A * | 1/1994 | Ball ................. H02G 3/065 174/542 |
| 5,383,688 A | 1/1995 | Berry |
| 5,456,050 A | 10/1995 | Ward |
| 5,594,202 A | 1/1997 | Tobias |
| 5,866,853 A | 2/1999 | Sheehan |
| 5,912,431 A | 6/1999 | Sheehan |
| 6,179,340 B1 | 1/2001 | Adolf et al. |
| 6,241,199 B1 | 6/2001 | Ismert |
| 6,424,267 B1 | 7/2002 | Schell et al. |
| 6,511,099 B2 | 1/2003 | Bartholomae et al. |
| 6,521,833 B1 * | 2/2003 | DeFreitas ........... F16L 25/0045 174/50 |
| 6,530,187 B2 | 3/2003 | Shimizu |
| 6,725,788 B2 | 4/2004 | McCartney et al. |
| 6,752,361 B2 | 6/2004 | Chou |
| 7,214,890 B2 | 5/2007 | Kiely et al. |
| 7,390,980 B1 | 6/2008 | Gretz |
| 7,845,089 B1 | 12/2010 | Lavalle |
| 8,415,571 B2 | 4/2013 | Kiely et al. |
| 9,705,295 B1 | 7/2017 | Smith |
| 9,835,276 B2 | 12/2017 | Wu et al. |
| 10,269,473 B1 | 4/2019 | Gretz |
| 2006/0054340 A1 | 3/2006 | Auray et al. |
| 2009/0178845 A1 | 7/2009 | Auray et al. |
| 2009/0236848 A1 | 9/2009 | Foreman et al. |

\* cited by examiner

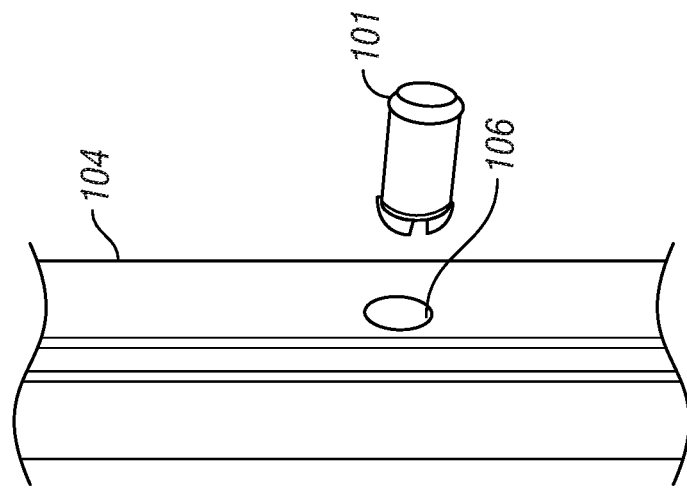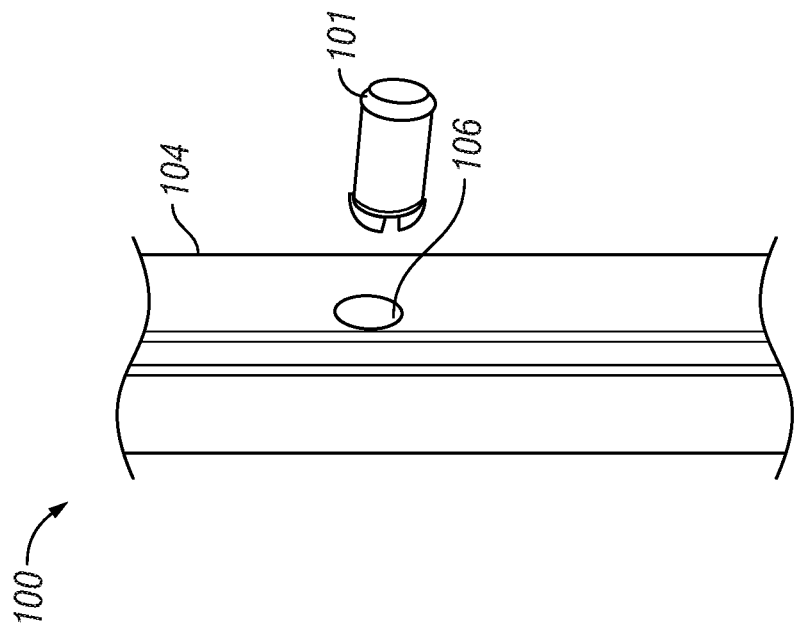
FIG. 4

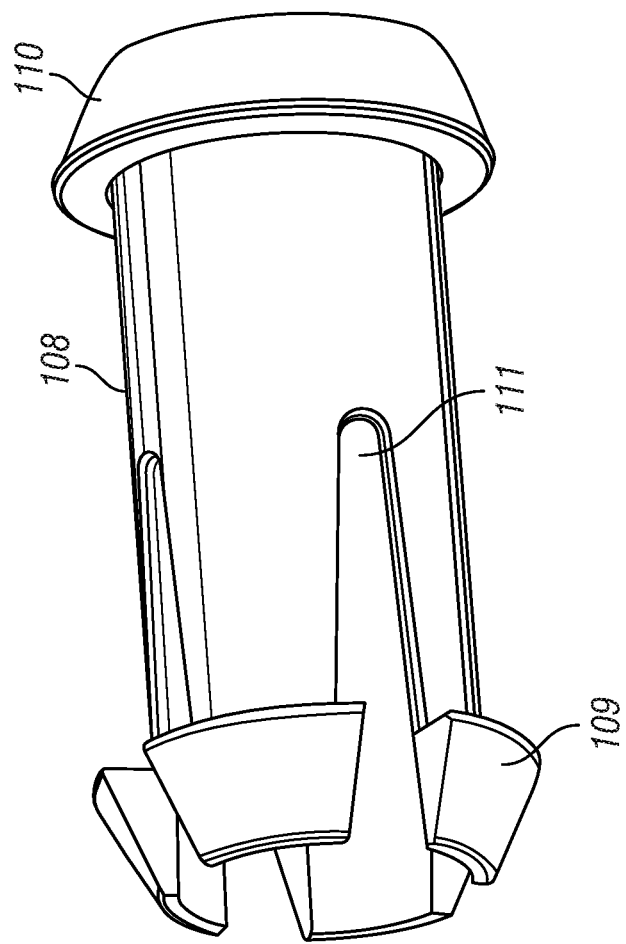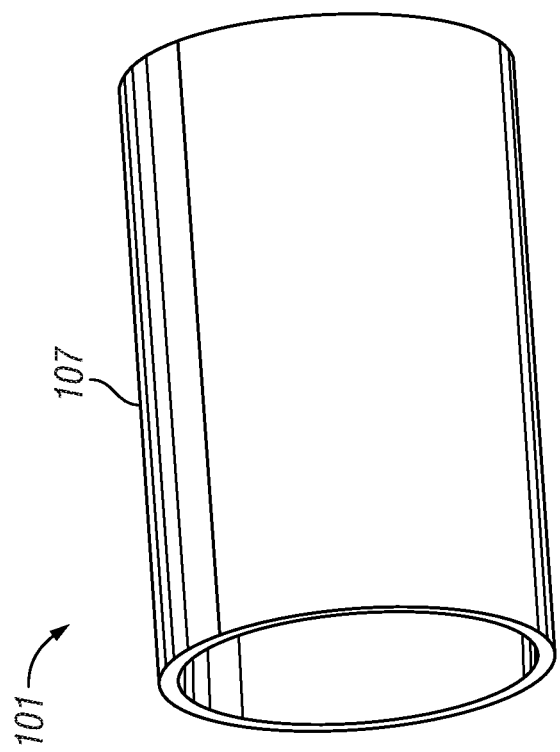
FIG. 5

APPARATUS FOR PRODUCING DIFFERENT SIZED BOXES

RELATED APPLICATIONS

This application is a continuation-in-part application which claims priority to U.S. Utility application Ser. No. 15/496,971, filed Apr. 25, 2017, which in turn claims priority to U.S. Provisional Patent Application Ser. No. 62/326,974 filed Apr. 26, 2016, both of which are hereby incorporated by reference in its entirety for all purposes.

BACKGROUND OF THE INVENTION

The electrical wiring in a structure is protected from moisture, flammable gas, chemical vapors, impact, and the like by being placed in electrical conduit. Electrical conduit has many diameters and is typically made from metal (e.g., steel, aluminum, etc.) or plastics (e.g., polyvinyl chloride (PVC), etc.). Local building codes and the U.S. National Electrical Code (NEC) specify the form and installation details for electrical conduit.

Current conduit systems, however, are cumbersome to install and require the use of tools. What is needed is a simple and fast method of protecting wires traveling through studs or installing complete systems of electrical conduit without the use of tools.

SUMMARY OF THE INVENTION

The present invention provides a stud wire protector. The stud wire protector includes: a first hollow cylindrical and a second hollow cylindrical member. Methods of inserting the stud wire protector are also provided.

The present invention also provides an electrical conduit coupling system. The electrical conduit coupling system includes: two or more stud wire protectors and two or more conduit couplers. Methods of attaching the electrical conduit coupling system to two or more studs are also provided.

The stud wire protector provides protection of the wires passing therein from external damage from nails, screws, drills, and the like to prevent potential arc fault conditions. It provides a smooth surface to ease the process of pulling wire through which also protects wire from scrapes during the installation process.

The electrical conduit coupling system provides a simple and fast way for a user to insert electrical conduit in a structure without the use of tools. The electrical conduit coupling system comes in multiple sizes to accommodate all sizes of conduit.

The present invention provides a stud wire protector. The stud wire protector includes: a first hollow cylindrical member having a proximal end, a distal end, and configured to extend through and not beyond a stud; a second hollow cylindrical member having a first fitting at a proximal end and a second fitting at a distal end; wherein the second hollow cylindrical member is configured to fit within the first hollow cylindrical member, wherein the first fitting is configured to insert within and to extend beyond the proximal end of the first hollow cylindrical member, and wherein second fitting is configured to extend beyond distal end of the first hollow cylindrical member.

In one embodiment, the first fitting is a press-fitting. In one embodiment, the first fitting is a tapered press-fitting. In one embodiment, the second fitting is a tapered fitting. In one embodiment, the second hollow cylindrical member has one or more indentations around the circumference at the proximal end.

The present invention provides a stud wire protector. The stud wire protector includes: a first hollow cylindrical member having a proximal end, a distal end, and configured to extend through and not beyond a stud; a second hollow cylindrical member having a first press-fitting at a proximal end and a second fitting at a distal end; wherein the second hollow cylindrical member is configured to fit within the first hollow cylindrical member, wherein the first press-fitting is configured to insert within and to extend beyond the proximal end of the first hollow cylindrical member, and wherein second fitting is configured to extend beyond distal end of the first hollow cylindrical member.

In one embodiment, the first fitting is a tapered press-fitting. In one embodiment, the second fitting is a tapered fitting. In one embodiment, the second hollow cylindrical member has one or more indentations around the circumference at the proximal end.

The present invention provides a stud wire protector. The stud wire protector includes: a first hollow cylindrical member having a proximal end, a distal end, and configured to extend through and not beyond a stud; a second hollow cylindrical member having a first tapered press-fitting at a proximal end and a second tapered fitting at a distal end; wherein the second hollow cylindrical member is configured to fit within the first hollow cylindrical member, wherein the first tapered press-fitting is configured to insert within and to extend beyond the proximal end of the first hollow cylindrical member, and wherein second tapered fitting is configured to extend beyond distal end of the first hollow cylindrical member. In one embodiment, the second hollow cylindrical member has one or more indentations around the circumference at the proximal end.

The present invention provides a method of attaching stud wire protector to a stud, the method includes: providing a stud wire protector comprising: a first hollow cylindrical member having a proximal end, a distal end, and configured to extend through a stud; a second hollow cylindrical member having a first fitting at a proximal end and a second fitting at a distal end; wherein the second hollow cylindrical member is configured to fit within the first hollow cylindrical member, wherein the first fitting is configured to insert within and to extend beyond the proximal end of the first hollow cylindrical member, wherein second fitting is configured to extend beyond distal end of the first hollow cylindrical member; and inserting and seeming the stud wire protector into a pre-drilled hole in a stud.

The present invention provides an electrical conduit coupling system. The electrical conduit coupling system includes: two or more stud wire protectors each independently including: a first hollow cylindrical member having a proximal end, a distal end, and configured to extend through and not beyond a stud: a second hollow cylindrical member having a first fitting at a proximal end and a second fitting at a distal end; wherein the second hollow cylindrical member is configured to fit within the first hollow cylindrical member, wherein the first fitting is configured to insert within and to extend beyond the proximal end of the first hollow cylindrical member, wherein second fitting is configured to extend beyond distal end of the first hollow cylindrical member: two or more conduit couplers each having a proximal end and a distal end, wherein the two or more conduit couplers are each independently configured at each proximal end to accept the first fitting and the second fitting, and wherein the two or more conduit couplers are configured at each distal end to accept a spring and an end of electrical conduit.

In one embodiment the first fitting is a press-fitting. In one embodiment, the first fitting is a tapered press-fitting. In one embodiment, the tapered press-fitting has a proximal end with a diameter less than a diameter of a distal end. In one embodiment, the second fitting is a tapered fitting. In one embodiment, the tapered fitting has a proximal end with a diameter greater than a diameter of a distal end. In one embodiment, the second hollow cylindrical member has one or more indentations around the circumference at the proximal end to the interior to allow for the proximal end of the second hollow cylindrical member to contract when the second hollow cylindrical member is inserted into the first hollow cylindrical member. In one embodiment, the two or more conduit couplers each independently comprise an internal cavity at the proximal end that accepts the exterior of the first fitting and the second fitting. In one embodiment, the two or more conduit couplers each independently comprise a tapered internal cavity at the proximal end that accepts a tapered exterior of the first fitting and the second fitting. In one embodiment, the two or more conduit couplers each independently comprise a circular cavity at the distal end that accepts a spring and an end of electrical conduit. In one embodiment, the electrical conduit is polyvinyl chloride (PVC) electrical conduit.

The present invention provides an electrical conduit coupling system. The electrical conduit coupling system includes: two or more stud wire protectors each independently including: a first hollow cylindrical member having a proximal end, a distal end, and configured to extend through and not beyond a. stud; a second hollow cylindrical member having a first press-fitting at a proximal end and a second fitting at a distal end; wherein the second hollow cylindrical member is configured to fit within the first hollow cylindrical member, wherein the first press-fitting is configured to insert within and to extend beyond the proximal end of the first hollow cylindrical member, wherein second fitting is configured to extend beyond distal end of the first hollow cylindrical member; two or more conduit couplers each having a proximal end and a distal end, wherein the two or more conduit couplers are each independently configured at each proximal end to accept the first press-fitting and the second fitting, and wherein the two or more conduit couplers are configured at each distal end to accept a spring and an end of electrical conduit.

In one embodiment, the first press-fitting is a tapered press-fitting. In one embodiment, the tapered press-fitting has a proximal end with a diameter less than a diameter of a distal end. In one embodiment, the second fitting is a tapered fitting. In one embodiment, the tapered fitting has a proximal end with a diameter greater than a diameter of a distal end. In one embodiment, the second hollow cylindrical member has one or more indentations around the circumference at the proximal end to the interior to allow for the proximal end of the second hollow cylindrical member to contract when the second hollow cylindrical member is inserted in to the first hollow cylindrical member. In one embodiment, the two or more conduit couplers each independently comprise an internal cavity at the proximal end that accepts the exterior of the first press-fitting and the second fitting. In one embodiment, the two or more conduit couplers each independently comprise a tapered internal cavity at the proximal end that accepts a tapered exterior of the first press-fitting and the second fitting. In one embodiment, the two or more conduit couplers each independently comprise a circular cavity at the distal end that accepts a spring and an end of electrical conduit. In one embodiment, the electrical conduit is polyvinyl chloride (PVC) electrical conduit.

The present invention provides an electrical conduit coupling system. The electrical conduit coupling system includes: two or more stud wire protectors each independently including: a first hollow cylindrical member having a proximal end, a distal end, and configured to extend through and not beyond a stud; a second hollow cylindrical member having a first tapered press-fitting at a proximal end and a second tapered fitting at a distal end: wherein the second hollow cylindrical member is configured to fit within the first hollow cylindrical member. wherein the first tapered press-fitting is configured to insert within and to extend beyond the proximal end of the first hollow cylindrical member, wherein second tapered fitting is configured to extend beyond distal end of the first hollow cylindrical member; two or more conduit couplers each having a proximal end and a distal end, wherein the two or more conduit couplers are each independently configured at each proximal end to accept the first tapered press-fitting and the second tapered fitting, and wherein the two or more conduit couplers are configured at each distal end to accept a spring and an end of polyvinyl chloride (PVC) electrical conduit.

In one embodiment, the first tapered press-fitting has a proximal end with a diameter less than a diameter of a distal end. In one embodiment the second tapered fitting has a proximal end with a diameter greater than a diameter of a distal end. In one embodiment, the second hollow cylindrical member has one or more indentations around the circumference at the proximal end to the interior to allow for the proximal end of the second hollow cylindrical member to contract when the second hollow cylindrical member is inserted into the first hollow cylindrical member. In one embodiment, the two or more conduit couplers each independently comprise an internal cavity at the proximal end that accepts the exterior of the first tapered press-fitting and the second tapered fitting. In one embodiment, the two or more conduit couplers each independently comprise a tapered internal cavity at the proximal end that accepts the tapered exterior of the first tapered press-fitting and the second tapered fitting. In one embodiment, the two or more conduit couplers each independently comprise a circular cavity at the distal end that accepts a spring and an end of polyvinyl chloride (PVC) electrical conduit. In one embodiment, the first hollow cylindrical member, the second hollow cylindrical member, the two or more conduit couplers, or a combination thereof each independently comprise polyvinyl chloride (PVC).

The present invention provides a method of attaching an electrical conduit coupling system to two or more studs. The method includes: providing an electrical conduit coupling system including: two or more stud wire protectors each independently including: a first hollow cylindrical member having a proximal end, a distal end, and configured to extend through and not beyond a stud: a second hollow cylindrical member having a first fitting at a proximal end and a second fitting at a distal end; wherein the second hollow cylindrical member is configured to fit within the first hollow cylindrical member, wherein the first fitting is configured to insert within and to extend beyond the proximal end of the first hollow cylindrical member, wherein second fitting is configured to extend beyond distal end of the first hollow cylindrical member; two or more conduit couplers each having a proximal end and a distal end, wherein the two or more conduit couplers are each independently configured at each proximal end to accept the first fitting and the second fitting, wherein the two or more conduit couplers are configured at each distal end to accept a spring and an end of electrical conduit inserting and securing the two or more stud wire protectors into two or more pre-drilled holes in two or more adjacent studs; inserting two or more springs into each of the distal ends of two or more conduit couplers; inserting each end of an electrical conduit into the distal ends of two or more conduit couplers that each contain a spring to provide an electrical conduit assembly; attaching a first end of the electrical conduit assembly to a first stud fitting secured in a first stud; and attaching a second end of the electrical conduit assembly to a second stud fitting secured in a second stud.

The present invention provides a method of attaching an electrical conduit coupling system to two or more studs. The method includes: providing a polyvinyl chloride (PVC) electrical conduit coupling system including: two or more stud wire protectors each independently including: a first hollow cylindrical member having a proximal end, a distal end, and configured to extend through and not beyond a stud; a second hollow cylindrical member having a first fitting at a proximal end and a second fitting at a distal end; wherein the second hollow cylindrical member is configured to fit within the first hollow cylindrical member, wherein the first fitting is configured to insert within and to extend beyond the proximal end of the first hollow cylindrical member, wherein second fitting is configured to extend beyond distal end of the first hollow cylindrical member; two or more conduit couplers each having a proximal end and a distal end, wherein the two or more conduit couplers are each independently configured at each proximal end to accept the first fitting and the second fitting, wherein the two or more conduit couplers are configured at each distal end to accept a spring and an end of electrical conduit; inserting and securing the two or more stud wire protectors into two or more pre-drilled holes in two or more adjacent studs; inserting two or more springs into each of the distal ends of two or more conduit couplers; inserting each end of a polyvinyl chloride (PVC) electrical conduit into the distal ends of two or more conduit couplers that each contain a spring to provide a polyvinyl chloride (PVC) electrical conduit assembly; attaching a first end of the polyvinyl chloride (PVC) electrical conduit assembly to a first stud fitting secured in a first stud; and attaching a second end of the polyvinyl chloride (PVC) electrical conduit assembly to a second stud fitting secured in a second stud.

BRIEF DESCRIPTION OF THE DRAWINGS

Embodiments of the invention may be best understood by referring to the following description and accompanying drawings, which illustrate such embodiments. In the drawings:

FIG. 4 is a perspective drawing illustrating exemplary stud wire protectors and pre-drilled studs.

FIG. 5 is a perspective drawing illustrating an exemplary stud wire protector that includes a first hollow cylindrical member and a second hollow cylindrical member.

Figure 1:
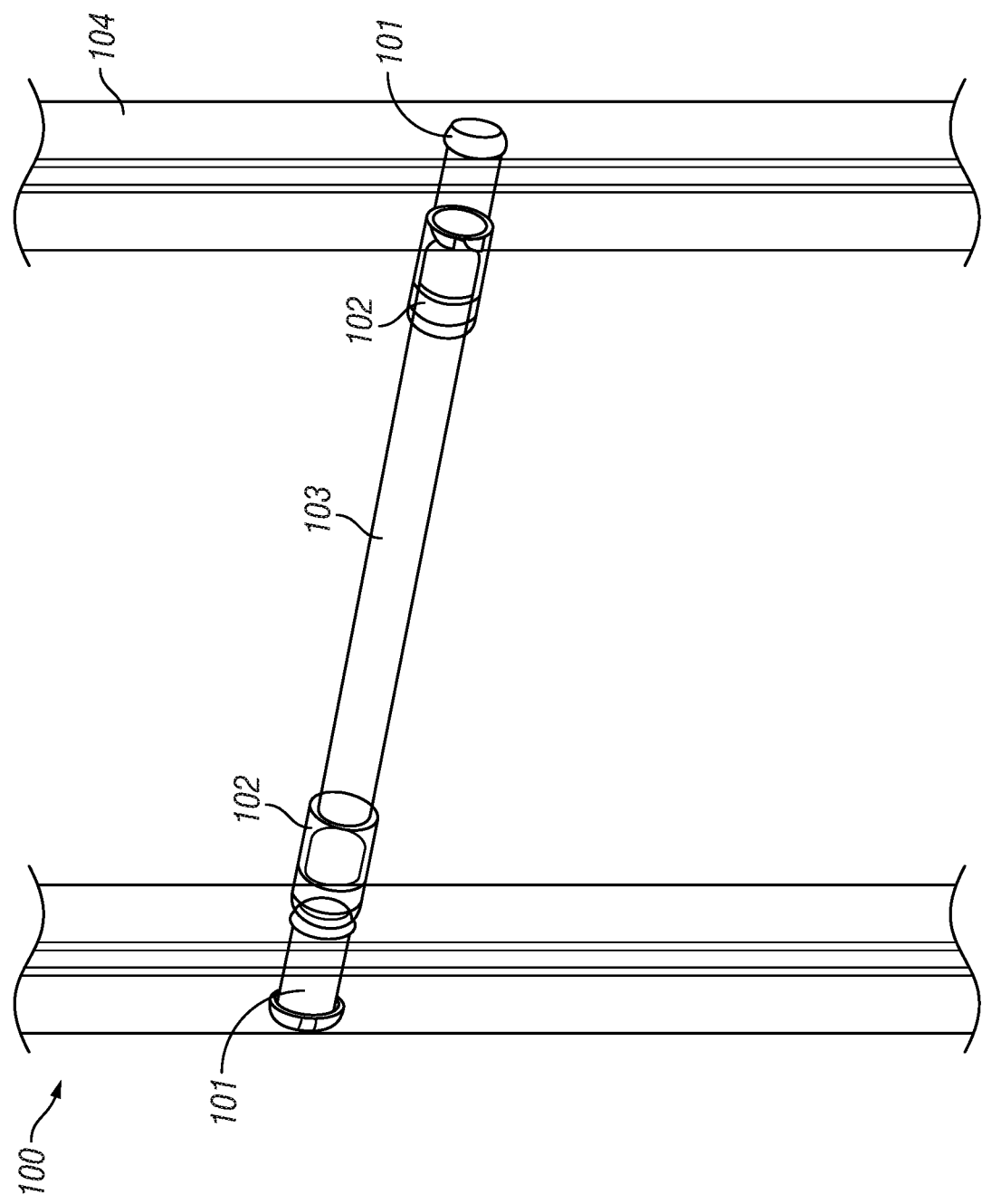
FIG. 1 is a perspective drawing illustrating an exemplary electrical conduit coupling system.

The drawings are not necessarily to scale. Like numbers used in the figures refer to like components, steps, and the like. However, it will be understood that the use of a number to refer to a component in a given figure is not intended to limit the component in another figure labeled with the same number.

DETAILED DESCRIPTION OF THE INVENTION

The present invention provides a stud wire protector. The stud wire protector includes: a first hollow cylindrical and a second hollow cylindrical member. Methods of inserting the stud wire protector are also provided.

The present invention also provides an electrical conduit coupling system. The electrical conduit coupling system includes: two or more stud wire protectors and two or more conduit couplers. Methods of attaching the electrical conduit coupling system to two or more studs are also provided.

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense, and the scope of the present invention is defined by the appended claims and their equivalents.

Before the present invention is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the claims made herein.

Methods recited herein may be carried out in any order of the recited events which is logically possible, as well as the recited order of events. Furthermore, where a range of values is provided, it is understood that every intervening value, between the upper and lower limit of that range and any other stated or intervening value in that stated range is encompassed within the invention. Also, it is contemplated that any optional feature of the inventive variations described may be set forth and claimed independently, or in combination with any one or more of the features described herein.

The referenced items are provided solely for their disclosure prior to the filing date of the present application. Nothing herein is to be construed as an admission that the present invention is not entitled to antedate such material by virtue of prior invention.

Unless otherwise indicated, the words and phrases presented in this document have their ordinary meanings to one of skill in the art. Such ordinary meanings can be obtained by reference to their use in the art and by reference to general and scientific dictionaries, for example, *Webster's Third New International Dictionary*, Merriam-Webster Inc., Springfield, M A, 1993 and *The American Heritage Dictionary of the English Language*, Houghton Mifflin, Boston Mass., 1981.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "and/or" refers to any one of the items, any combination of the items, or all of the items with which this term is associated.

As used herein, the singular forms "a," "an," and "the" include plural reference unless the context clearly dictates otherwise. It is further noted that the claims may be drafted to exclude any optional element As such, this statement is intended to serve as antecedent basis for use of such exclusive terminology as "solely," "only," and the like in connection with the recitation of claim elements, or use of a "negative" limitation.

As used herein, the term "comprising" or "comprises" is intended to mean that the compositions and methods include the recited elements, hut not excluding others.

As used herein, the term "coupled" means the joining of two members directly or indirectly to one another. Such joining may be stationary in nature or movable in nature and/or such joining may allow for the flow of fluids, electricity, electrical signals, or other types of signals or communication between two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

As used herein, the phrase "operatively coupled" refers to bringing two or more items together or into relationship with each other such that they may operate together or allow transfer of information between the two or more items.

As used herein, the terms "include," "for example," "such as" and the like are used illustratively and are not intended to limit the present invention.

As used herein, the terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

As used herein, the term "proximal" refers to the closest end of an object. In contrast, the term "distal" refers to the farthest end of an object.

As used herein, the terms "front," "back," "rear," "upper," "lower," "right," and "left" in this description are merely used to identify the various elements as they are oriented in the FIGS, with "front," "back," and "rear" being relative apparatus. These terms are not meant to limit the element which they describe, as the various elements may be oriented differently in various applications.

It will be understood that, although the terms first, second, etc. may be used herein to describe various elements, these elements should not be limited by these terms. These terms are only used to distinguish one element from another. For example, a first element could be termed a second element and, similarly, a second element could be termed a first element without departing from the teachings of the disclosure.

The invention illustratively disclosed herein suitably may be practiced in the absence of any element which is not specifically disclosed herein.

Figure 2:
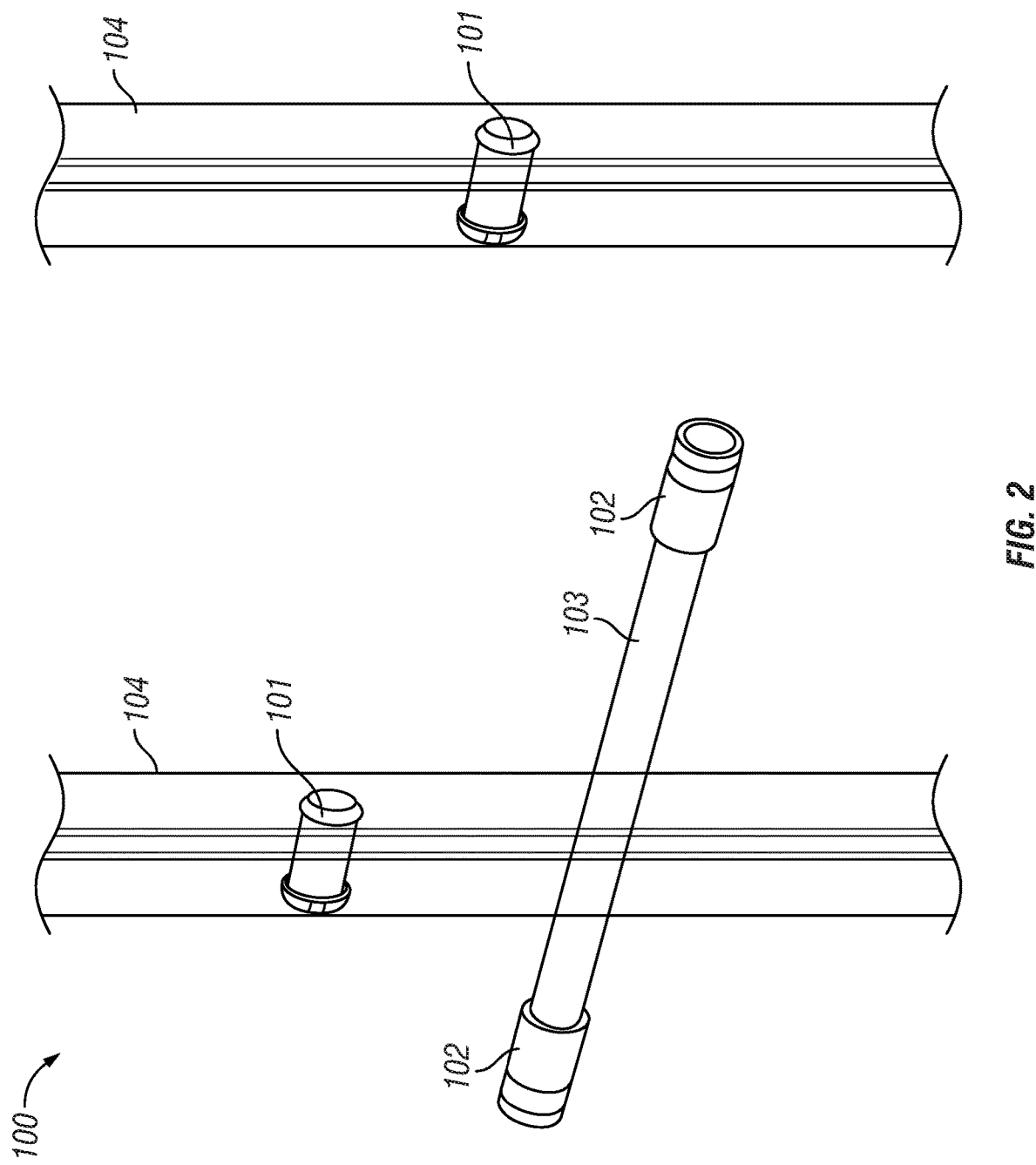
FIG. 2 is a perspective drawing illustrating an exemplary electrical conduit coupling system.
Figure 3:
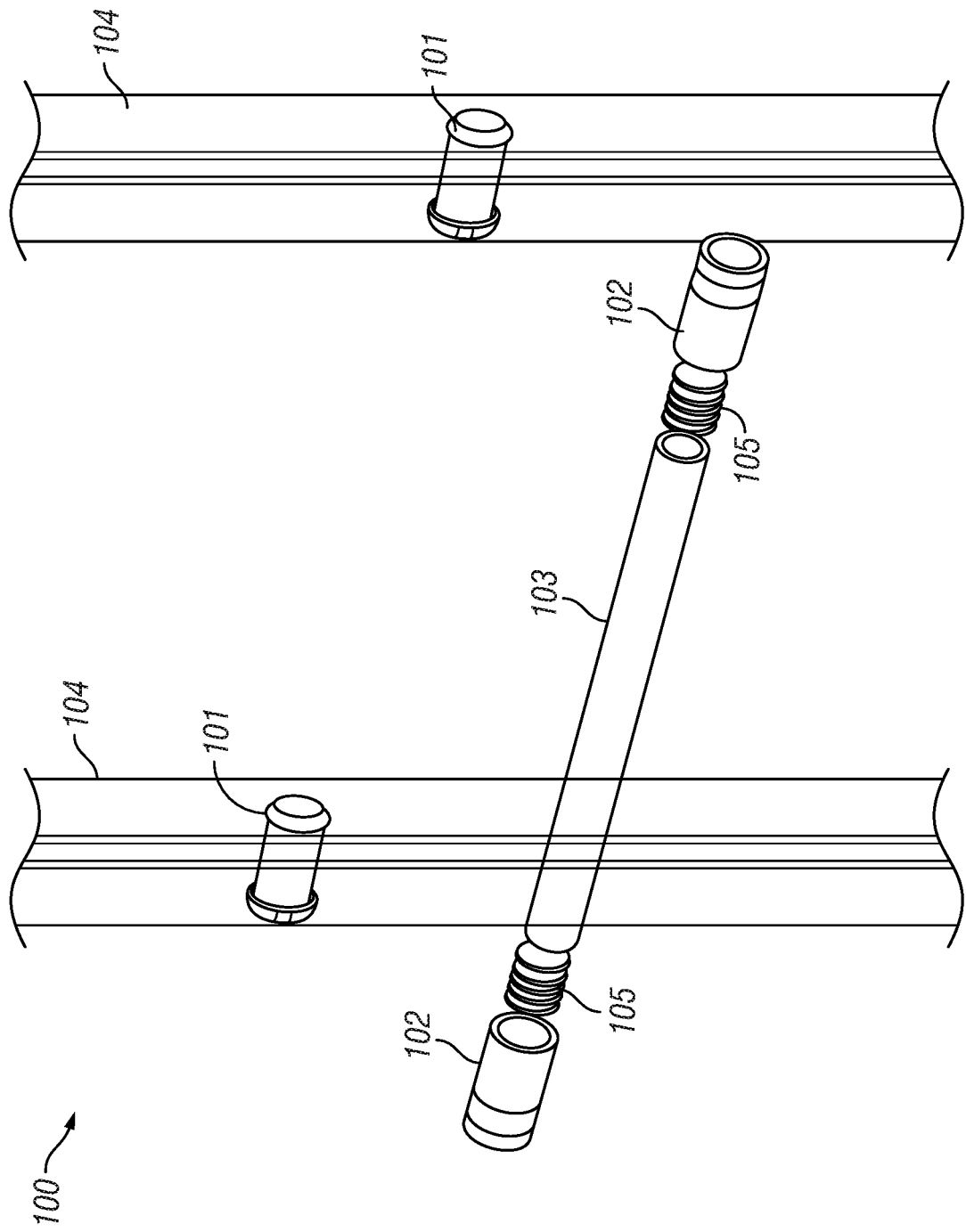
FIG. 3 is a perspective drawing illustrating an exemplary electrical conduit coupling system.
Figure 6:
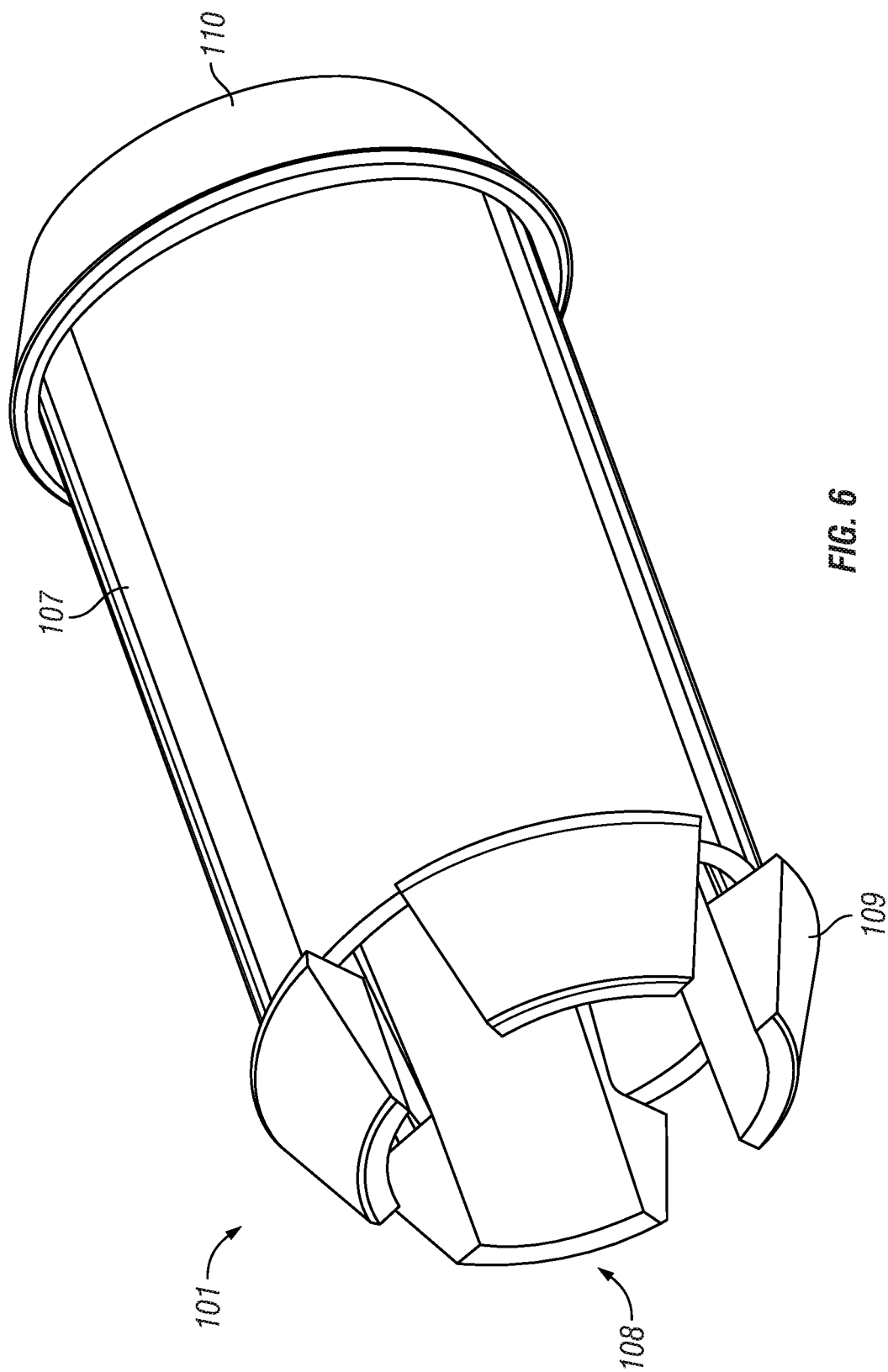
FIG. 6 is a perspective drawing illustrating an exemplary stud wire protector.
Figure 7:
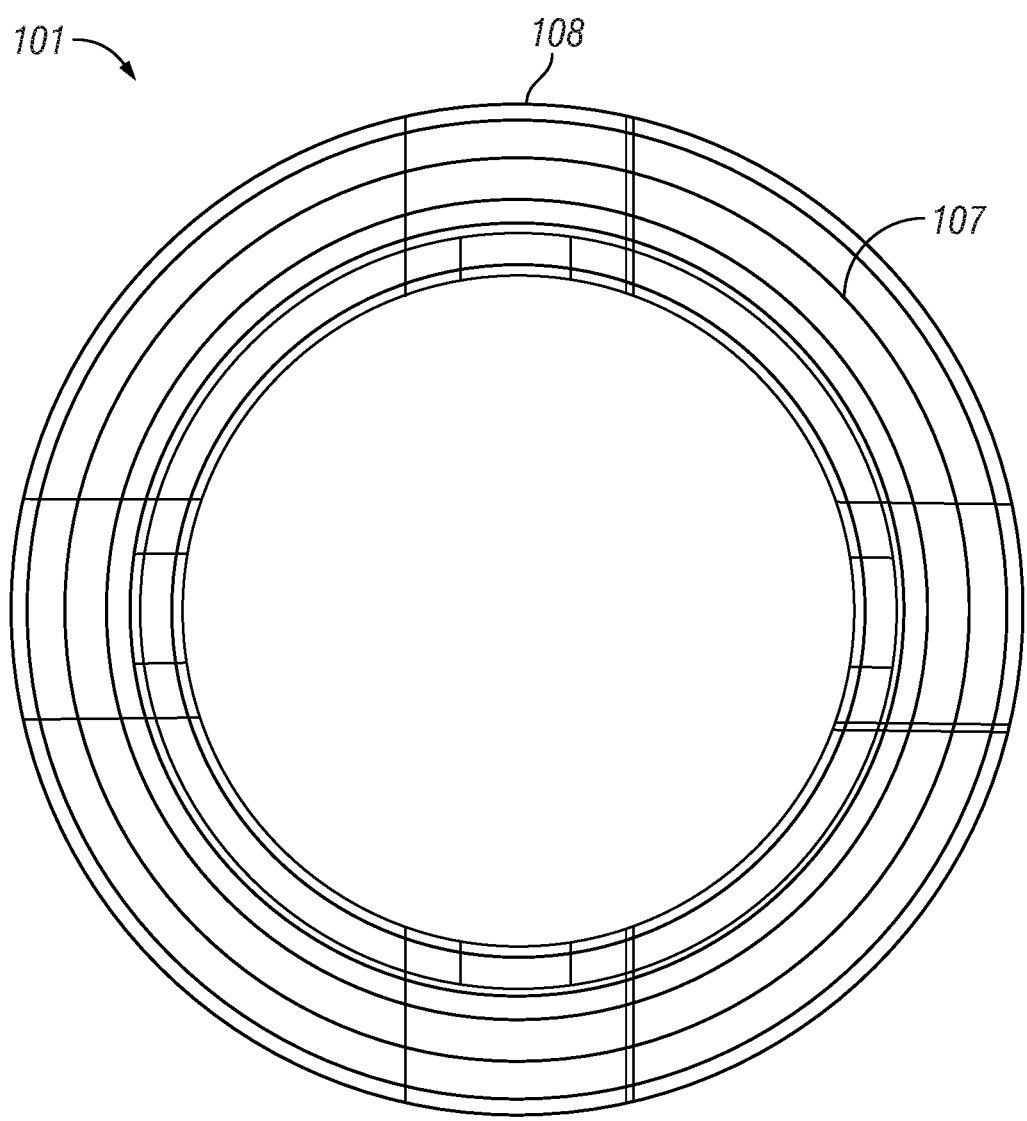
FIG. 7 is a bottom-view drawing illustrating an exemplary stud wire protector.
Figure 8:
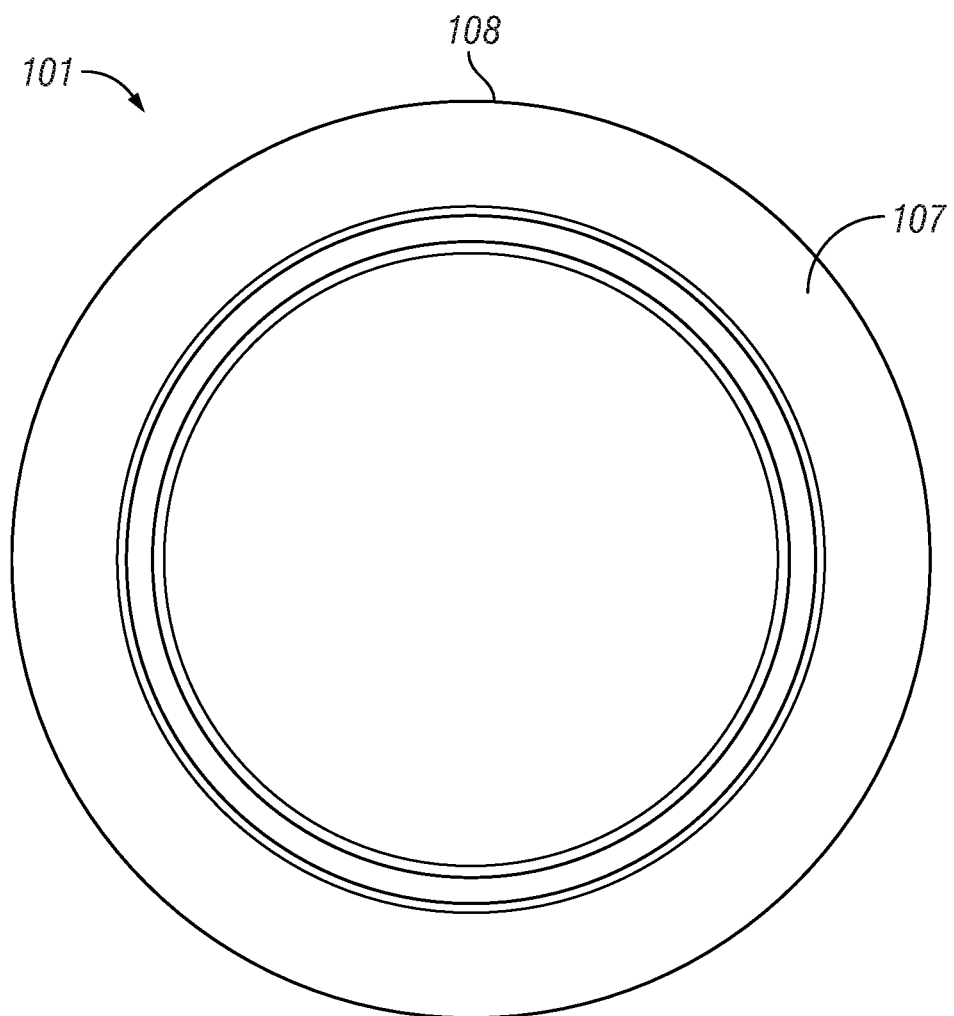
FIG. 8 is a top-view drawing illustrating an exemplary stud wire protector.
Figure 9:
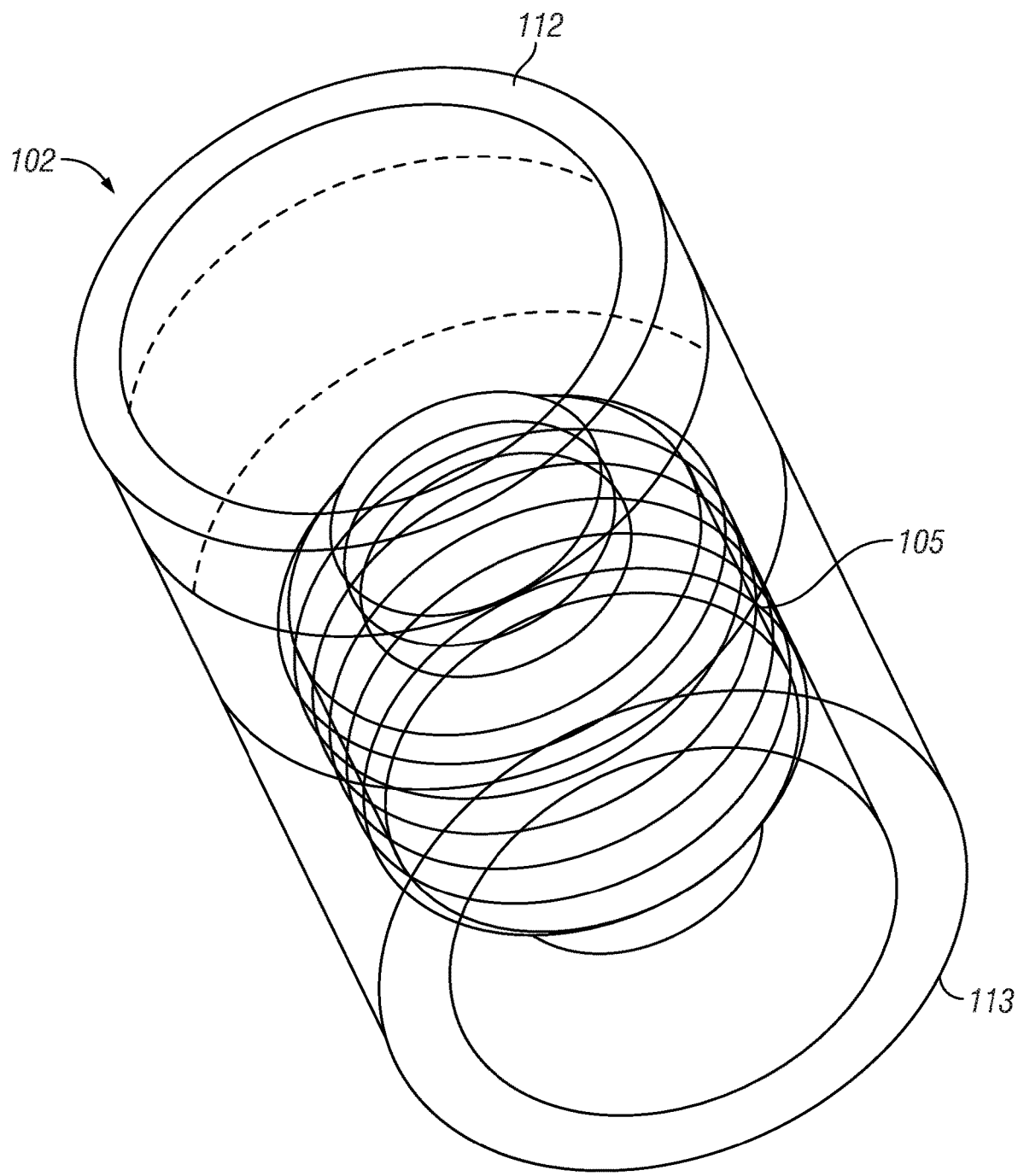
FIG. 9 is a perspective drawing illustrating an exemplary conduit coupler.
Figure 10:
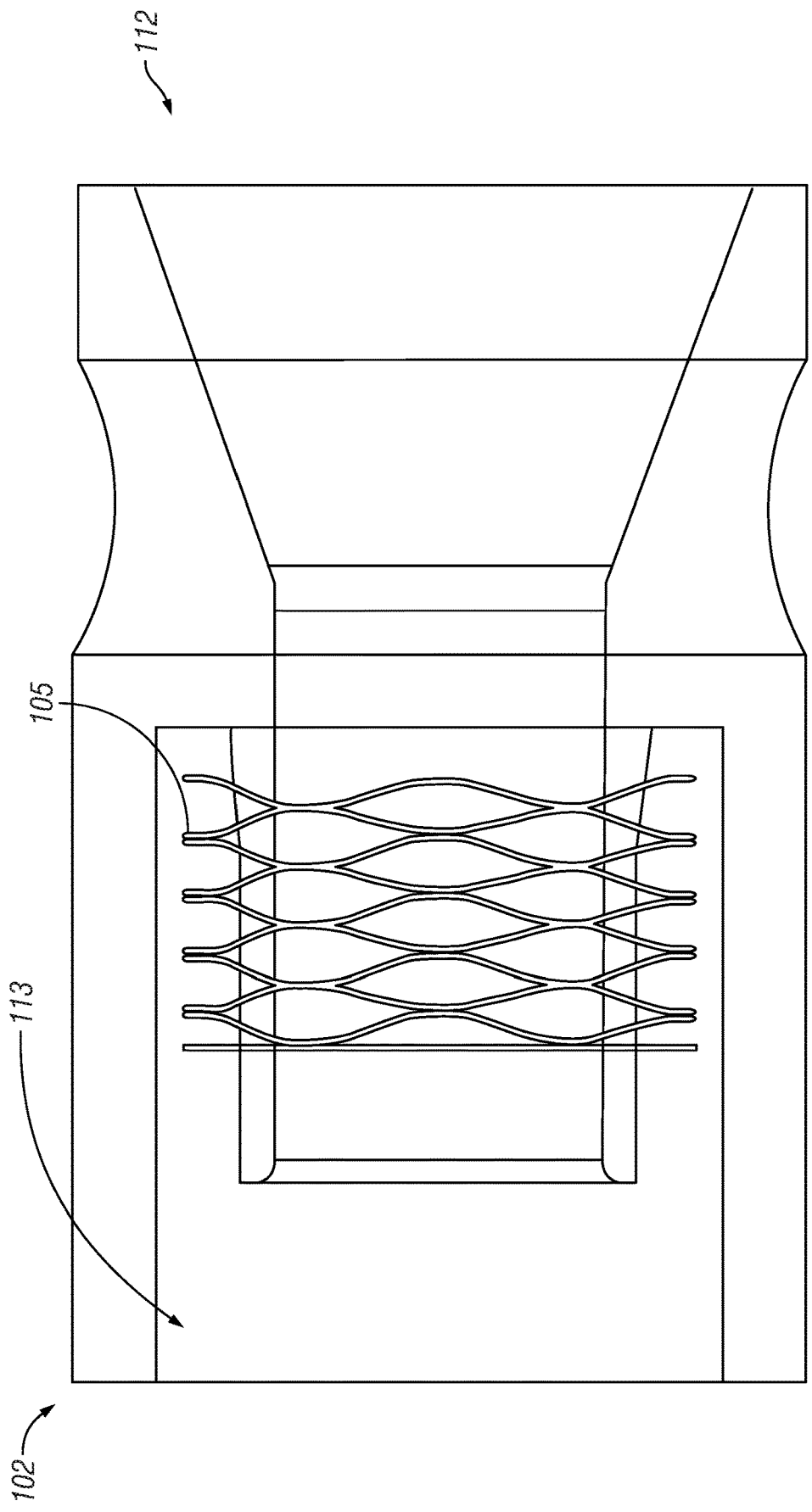
FIG. 10 is a side-view drawing illustrating an exemplary conduit coupler.
Figure 11:
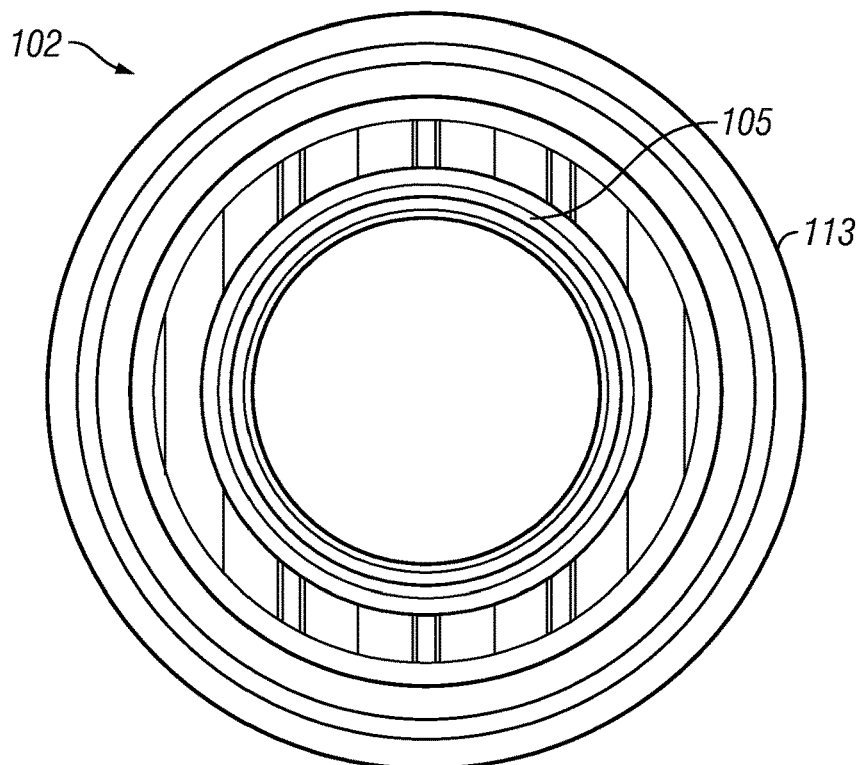
FIG. 11 is a bottom-view drawing illustrating an exemplary conduit coupler.
Figure 12:
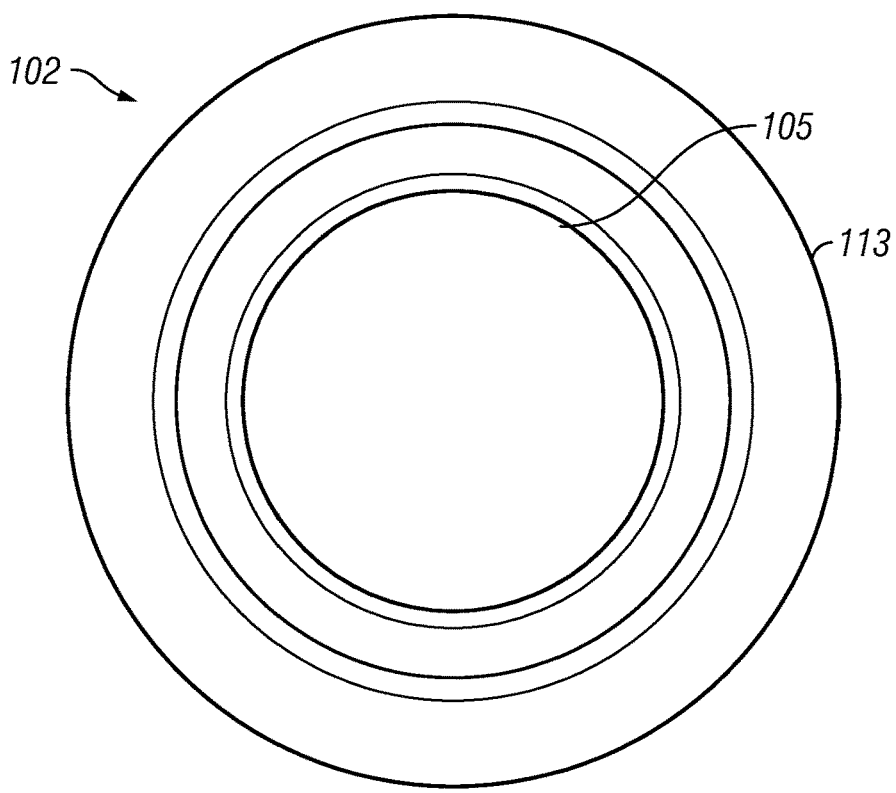
FIG. 12 is a top-view drawing illustrating an exemplary conduit coupler.
Figure 13:
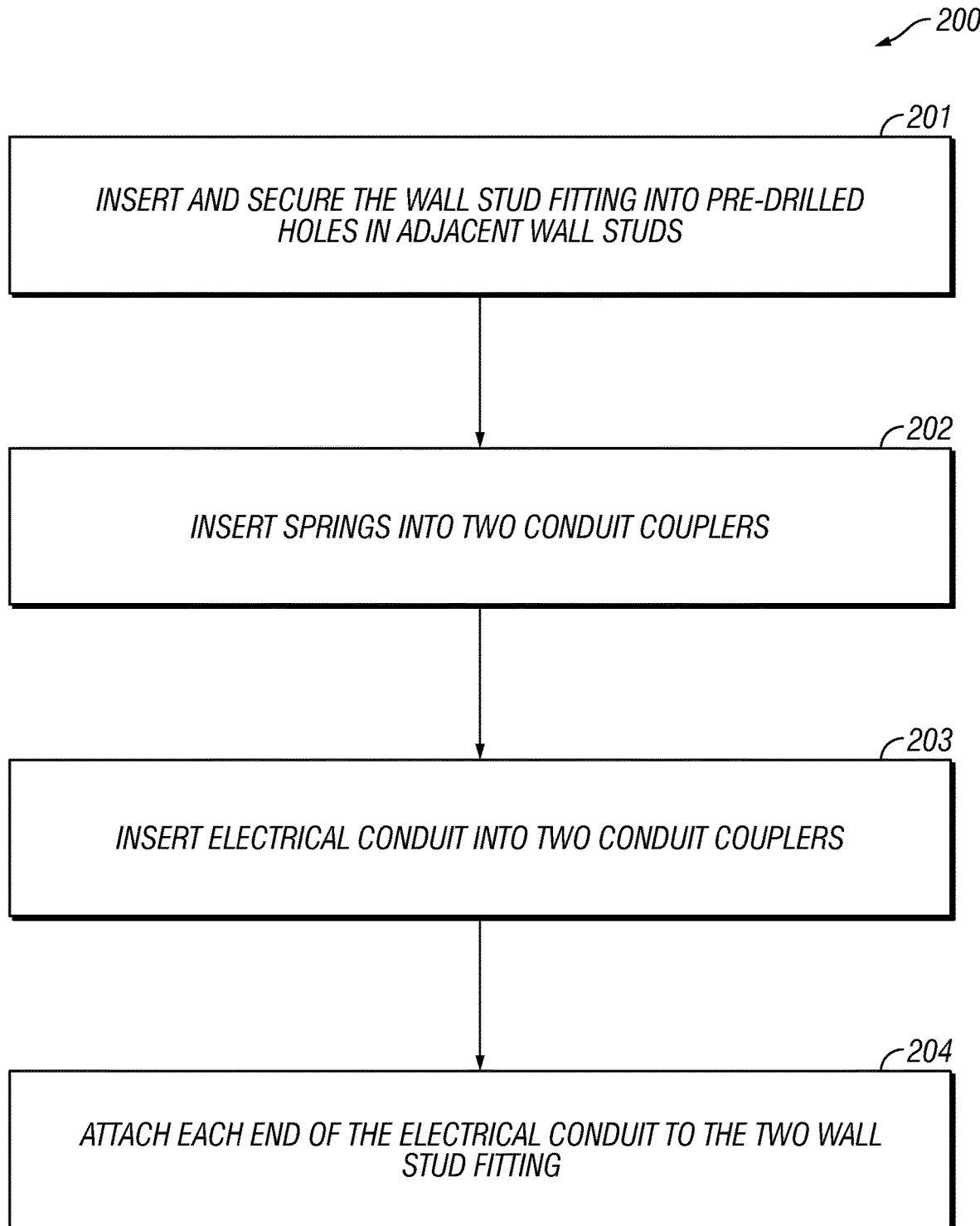
FIG. 13 is a block diagram illustrating an exemplary method of using an exemplary electrical conduit coupling system, according to an example embodiment.

FIGS. 1-3 are perspective drawing illustrating an exemplary electrical conduit coupling system 100. The electrical conduit coupling system 100 includes: two stud wire protectors 101 and two conduit couplers 102. The two stud wire protectors 101 are configured to extend through and not beyond the side of a stud 104. The two conduit couplers 102 each have a proximal end that is configured to accept both ends of the stud wire protectors 101. The distal end of the two conduit couplers 102 are configured with an internal cavity to accept a spring 105 followed by an end of electrical conduit 103.

To assemble the electrical conduit coupling system 100, the springs 105 are inserted into each of the cavities in the distal end of each of the two conduit couplers 102. The ends of a pre-cut piece of electrical conduit 103 are inserted into each of the two conduit couplers 102 containing springs 105 to provide a conduit assembly. Finally, the conduit assembly is compressed by the user (not shown) and each end is inserted into the ends of the wall fittings 101 in the studs 104. Once the conduit assembly is in place, the user (not shown) releases the tension on the conduit assembly and the conduit assembly fits snuggly into place. This process is continued until the electrical conduit for the room is in place. At that time, the electrical wires are inserted into the conduit.

To disassemble the electrical conduit coupling system 100, the user (not shown) compresses the conduit assembly, removes the conduit assembly from the structure, compresses the press-fitting on the proximal end of each of the wall fittings 101, and removes the wall fittings 101 from the studs 104.

FIG. 4 is a perspective drawing illustrating an exemplary stud wire protector 101 and studs 104 that contain pre-drilled holes 106. The wall fittings 101 are inserted with pressure into the pre-drilled holes 106 in the studs 104 so that both ends of the wall fittings 101 protrude from the surface of the studs 104.

FIGS. 5-8 are drawings illustrating an exemplary stud wire protector 101 that includes a first hollow cylindrical member 107 and a second hollow cylindrical member 108. The first hollow cylindrical member 107 is a tubular sleeve that has a length less than or equal to the width of a stud in which the stud wire protector is to be used. In a residential setting using balloon wall construction uses 2"×4" studs which in reality are 1.5" in width. In many commercial settings the studs used are the same width. In other commercial settings metal studs are employed which may have a different width dimension. It is to be understood that the length of the tubular sleeve 107 can be any dimension so that in application the length of the tubular sleeve is about equal to the width of the stud used in wall construction.

In other words, the first hollow cylindrical member or sleeve 107 has a length substantially equal to the width of a stud into which it will be placed. In some applications, it may be necessary to protect against nail penetration across a pair of studs. In this case the first hollow cylindrical member or sleeve 107 has a length substantially equal to the width of a pair of studs. It should be understood the first hollow cylindrical member or sleeve 107 can have a number of different lengths and that in most instances the length will be related to the width of a stud (1.5 inches) or a multiple thereof. The most common length of the sleeve 107 will be for the width of a single stud since this is the most common in frame construction for residences and some commercial buildings. The sleeve also has an inner diameter that will allow wire to pass within the sleeve. The sleeve has an outer diameter smaller than that associated with an opening in a common stud. In that way, the sleeve 107 and the wire protector 107 fit within the stud.

The first hollow cylindrical member or sleeve 107 is made of a material that will resist or prevent a nail or other fastener from penetrating the sleeve. The sleeve can be made of steel of sufficient thickness to stop a fastener either being pounded or screwed into a stud with a hammer or screwdriver, or to stop a nail from a nail gun. The first hollow cylindrical member 107 has a proximal end, a distal end, and is configured to extend through and not beyond a stud (not shown). The material, in one embodiment, has a Rockwell hardness index value in the range of 120-200. In another embodiment, the Rockwell hardness index value in the range of 140-180. In still a further embodiment, the Rockwell hardness index value in the range of 150-170. In another embodiment, the Rockwell hardness index value in the range of 157-164.

The material forming the sleeve must be sufficiently hard to resist penetration from various fasteners that might be placed into the formed wall at a later time. It should also be noted that the material can not be brittle such that it would crack when a sharp end of the fastener contacted the sleeve. Materials contemplated are galvanized steel, steel, stainless steel, ceramics, composite materials, and the like. Metals may be heat treated in various ways to provide a hard, exterior surface.

The hole in the stud can also be placed so that it is at a uniform distance above the floor or the bottom plate of a stud wall. The hole in the stud can also be placed at a uniform distance set back from the front face of the stud. These dimensions could be part of a building code or could be within a range set by a building code. In one embodiment, a jig is provided so that the openings in the studs of a wall frame are substantially uniform. In this case, the holes or openings in the studs would be substantially aligned so that pulling wire through the openings could be done with less effort.

The second hollow cylindrical member 108 has a first fitting 109 at a proximal end and a second fitting 110 at a distal end. The second hollow cylindrical member 108 is configured to fit within the first hollow cylindrical member or sleeve 107. The first fitting 109 is configured to insert within and to extend beyond the proximal end of the first hollow cylindrical member or sleeve 107. The second fitting 110 is configured to extend beyond distal end of the first hollow cylindrical member 107 when the second hollow cylindrical member 108 is inserted into the first hollow cylindrical member 107 or sleeve.

In one embodiment, the first fitting 109 is a press-fitting. In one embodiment, the press-fitting is a tapered press-fitting as shown. In one embodiment, the second fitting 110 is a tapered fitting as shown. In the embodiment shown, the second hollow cylindrical member 108 has a substantially tubular body. The ends of the substantially tubular body carry the first fitting 109 and the second fitting 110. The outside diameter of the second hollow cylindrical member 108 is substantially equal to the inner diameter of the sleeve 107. Generally, the outside diameter of the second hollow cylindrical member 108 is slightly less the inner diameter of the sleeve 107 to allow for easy assembly of the sleeve and second hollow cylindrical member 108. The second fitting 110 has a substantially tubular body with an outside diameter that allows the second fitting to fit within the inner diameter of the sleeve 107. At each end of the substantially tubular body of the second fitting is a flange. The flange has a rim with an outside diameter greater than the diameter of the first hollow cylindrical member or sleeve 107. The flange outside diameter of each flange of the second fitting is also greater than the diameter of the opening or hole in the stud into which it will be placed. In one embodiment, the second hollow cylindrical member 108 has an end with one or more indentations 111 that extend from the proximal end toward the interior to allow for the proximal end of the second hollow cylindrical member 108 to contract when the second hollow cylindrical member 108 is inserted into the first hollow cylindrical member 107. The indentations or slots 111 in the flange as well as the main body form flexible fingers which comprise the second fitting 108. The fingers are between the indentations 111 or slits. The second hollow cylindrical member 108 is made of a material that will allow the fingers formed to move through an elastic range so that the fingers can bend when inserted into a hole or opining within a stud and then return to an original position without plastic deformation. The stud wire protector 101 can then pass through the opening and snap or lock into a position when the fingers formed snap back to their original position. In other words, the slotted or indented end is also inserted into an opening or hole in a stud. As the end is inserted, the fingers bend elastically so that the flange on that end can pass through the opening. The fingers bounce back and return to the original position upon passing through the opening in the stud. This locks the stud wire protector 101 into place as the stud is captured between the slotted flange end and the solid flange end of the stud wire protector 101.

The wire protector 101 can be removed from the stud by pressing the fingers inwardly until the fingers are at a smaller diameter than the opening or hole in the stud. The wire protector 101 can then be moved so that the fingers are touching the inner wall of the opening. These can then be moved further until the wire protector is out of the opening in the stud.

FIGS. 9-13 are various drawings illustrating an exemplary conduit coupler 102.

The conduit coupler 102 includes a tapered internal cavity 112 at the proximal end that accepts a tapered exterior of the first fitting 109 and the second fitting 110 that are contained in the wall fittings 101. In other words, the conduit coupler 102 includes a tapered cavity 112 shaped to receive one or both of the flanged ends of the stud wire protector 101. In this case, the stud wire protector 101 is positioned in an opening in a stud in a framed up wall. In one embodiment, the conduit coupler 102 includes a circular cavity 113 at the distal end that accepts a spring 106 and an end of electrical conduit 103.

In one embodiment, the electrical conduit 103 is polyvinyl chloride (PVC) electrical conduit. In one embodiment, the electrical conduit 103 is a metal electrical conduit. In one embodiment, the electrical conduit 103 is a polyvinylidene fluoride (PVDF) electrical conduit.

Figure 14:
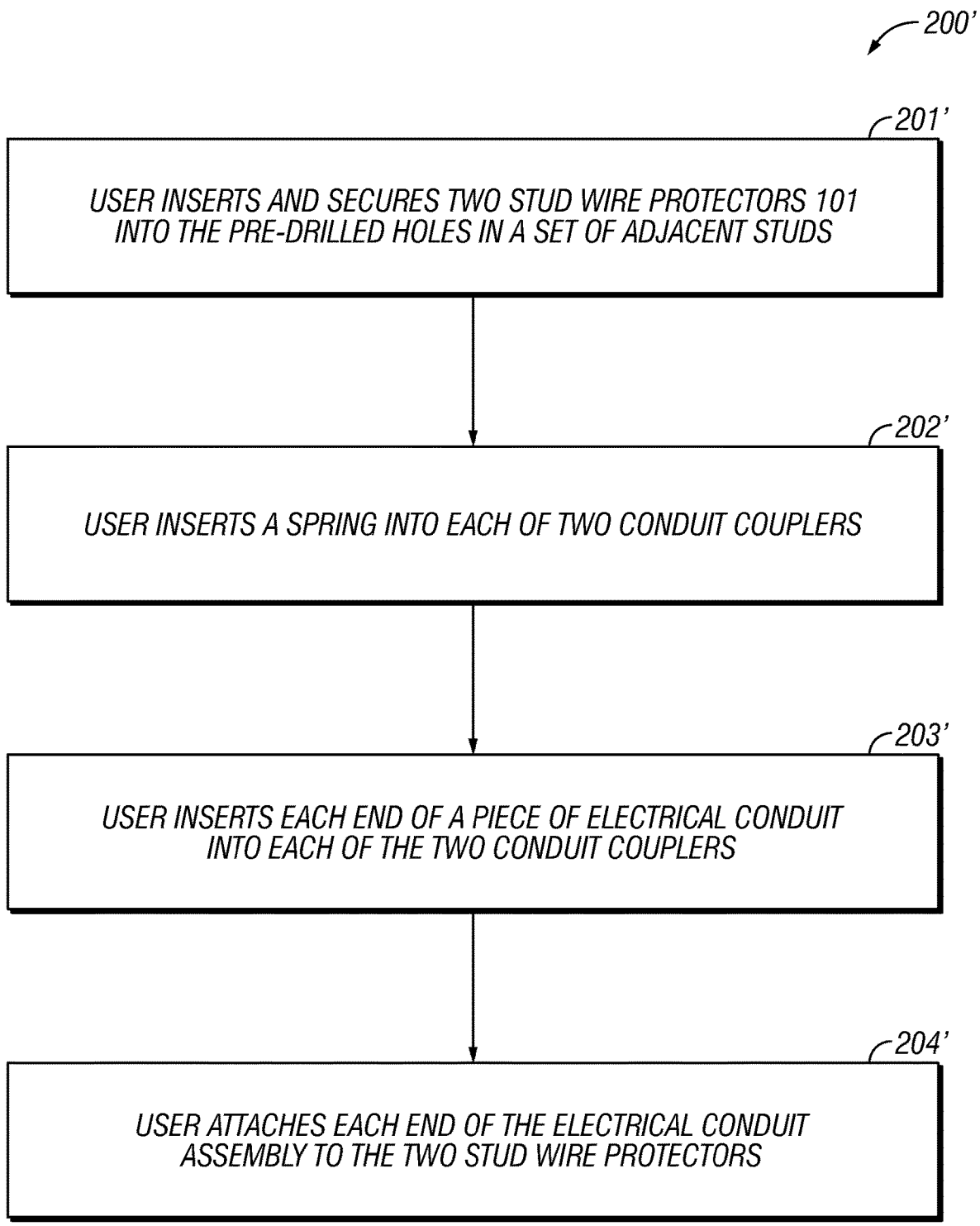
FIG. 14 is a block diagram illustrating an exemplary method of using an exemplary electrical conduit coupling system.

FIG. 14 is a block diagram illustrating an exemplary method 200 of using an exemplary electrical conduit coupling system. In step 201, the user inserts and secures two stud wire protectors 101 into the pre-drilled holes in a set of adjacent studs. In step 202, the user inserts a spring into each of two conduit couplers. In step 203, the user inserts each end of a piece of electrical conduit into each of the two conduit couplers. Finally, in step 204, the user attaches each end of the electrical conduit assembly to the two stud wire protectors.

Figure 15:
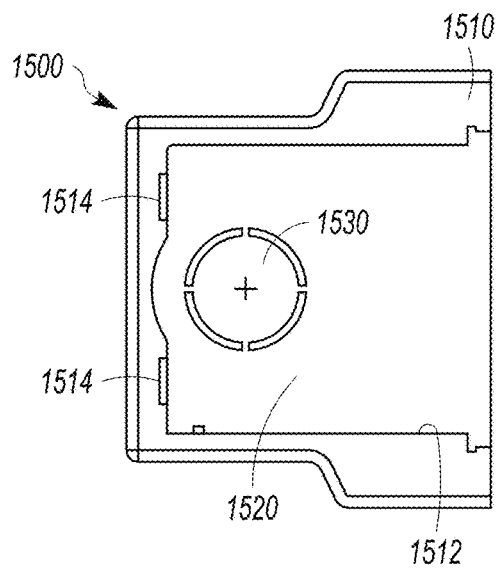
FIG. 15 is a first side view of an electrical box, according to an example embodiment.
Figure 16:
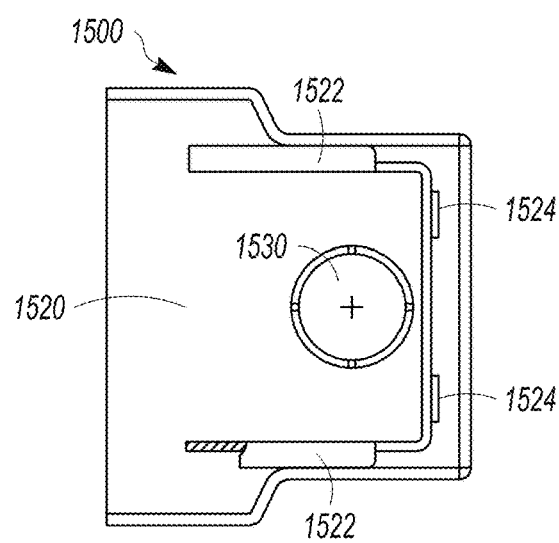
FIG. 16 is a second side view of an electrical box that includes a partial cross-sectional view portion corresponding to cutline A-A in FIG. 17, according to an example embodiment.
Figure 17:
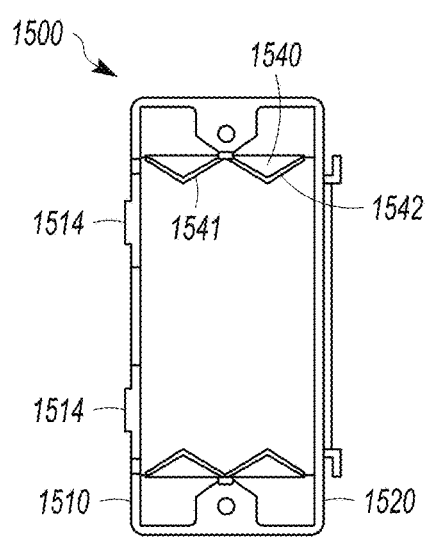
FIG. 17 is a front view of an electrical box, according to an example embodiment.

FIG. 17 is a front view of an electrical box 1500, according to an example embodiment. FIG. 15 is a first side view of an electrical box 1500, according to an example embodiment. FIG. 16 is a second side view of an electrical box 1500, according to an example embodiment. FIG. 16 also includes a partial cross-sectional view portion corresponding to cutline A-A in FIG. 17. Now referring to FIGS. 15-17, the electrical box 1500 will be further detailed. An electrical box 1500 includes a first side 1510 and a second side 1520. The first side 1510 has a cut out 1512 therein. The second side 1520 includes a first ridge 1521 and a second ridge 1522. Both the first ridge 1521 and the second ridge 1522 are on the exterior portion of the second side 1520. The first ridge 1521 is substantially parallel to the second ridge 1522. The first ridge 1521 and the second ridge 1522 are spaced apart from one another at a distance d substantially equal to the distance d between the two sides of the cut out 1512.

The first side 1510 has at least one locking tab 1514 positioned near one edge of the cut out 1512. The second side 1520 has at least one slit 1524 sized to receive a locking tab 1514 like the at least one locking tab 1514 on the first side 1510. In another embodiment, the first side 1510 of the electrical box has a plurality of locking tabs positioned near an edge of the cut out near a back of the electrical box, and the second side of the electrical box has a plurality of slits positioned for receiving the plurality of locking tabs. In the embodiment shown in FIGS. 15 and 16, there are two locking tabs associated with the first side 1510 and two slits associated with the second side 1520 of the electrical box 1500. It should be understood, that electrical box 1500 can be used alone or with another substantially similar electrical box.

Figure 18:
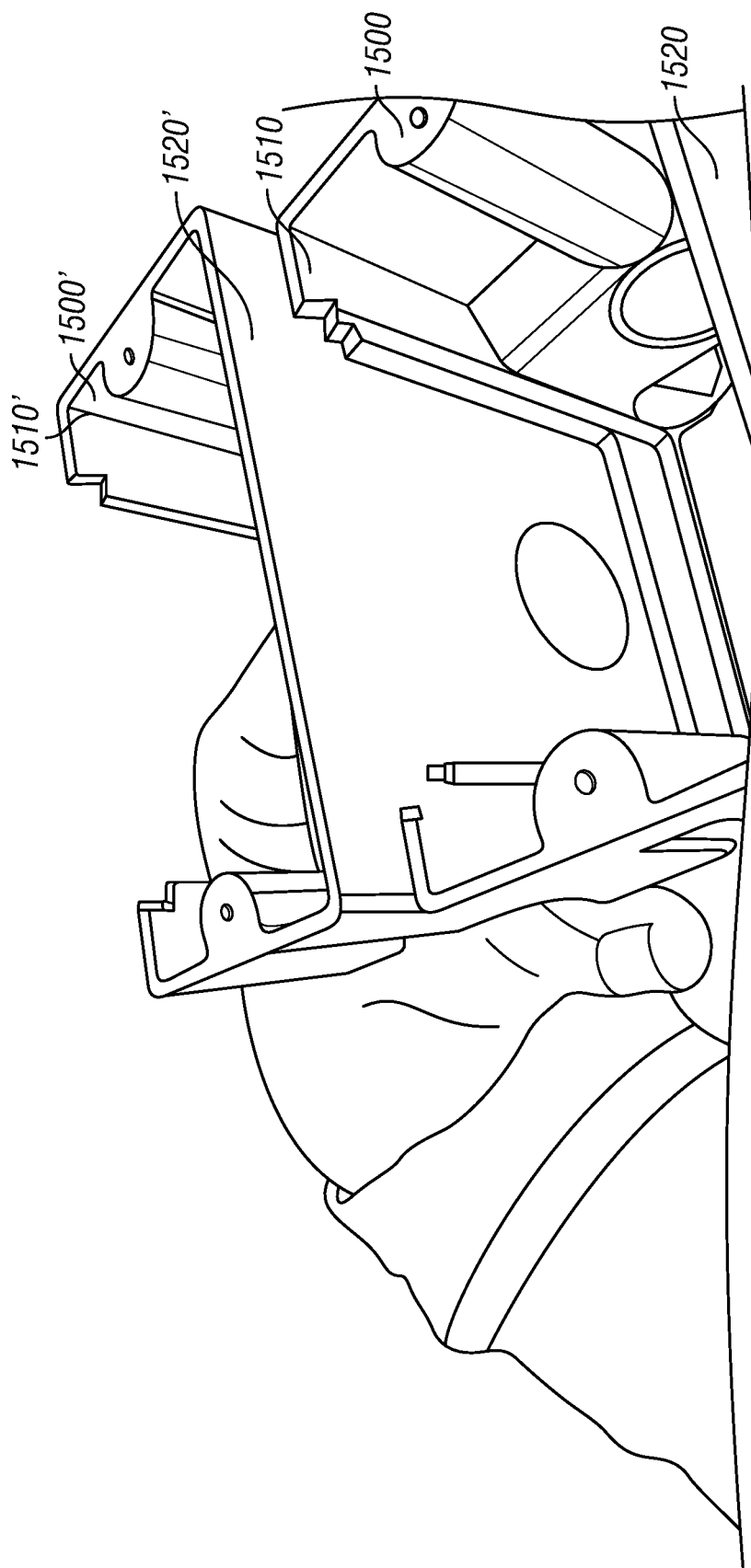
FIG. 18 is a perspective view of box being attached to another similar box, according to an example embodiment.

FIG. 18 is a perspective view of box 1500 being attached to another similar box 1500', according to an example embodiment. In the embodiment where at least two electrical boxes are connected, the first side 1510 of one electrical box 1500 is connected to the second side 1520' of the other electrical box 1500' to form a two-gang box. Additional boxes 1500 can be added to form a three-gang box, a four-gang box or box with "x" number gang box. The beauty of this design is that a contractor can carry just one style of box 1500 in inventory or on a truck. From the one style of box, a number of boxes 1500 can be assembled together to make various sizes of boxes with a desired number of gangs. An "x" gang box can be assembled from "x" number of boxes. So, a contractor does not have to carry three and four gang boxes on a service truck. Rather the contractor can form one from a number of the boxes 1500.

As shown in FIG. 17, the electrical box 1500 or insulative box also includes at least one punch plate 1530 (also shown in FIGS. 15 and 16) on one or more sides of the electrical box. The at least one punch plate 1530, in one embodiment, is substantially circular in shape. The electrical box 1500 includes an opening 1540 for receiving wire. As shown in FIG. 17, there are a plurality of openings 1540 for receiving wire so that the installer has a number to choose from. The opening for receiving wire 1540 further includes a first angled strain relief tab 1541, and a second angled strain relief tab 1542. The first angled strain relief tab 1541 and the second strain relief tab 1542 positioned near the opening for receiving wire. Each of the first angled strain relief tab 1541 and the second angled strain relief tab 1542 has a free end. The free ends of the tabs are not connected. In the embodiment shown, the free ends located near each other.

Figure 19:
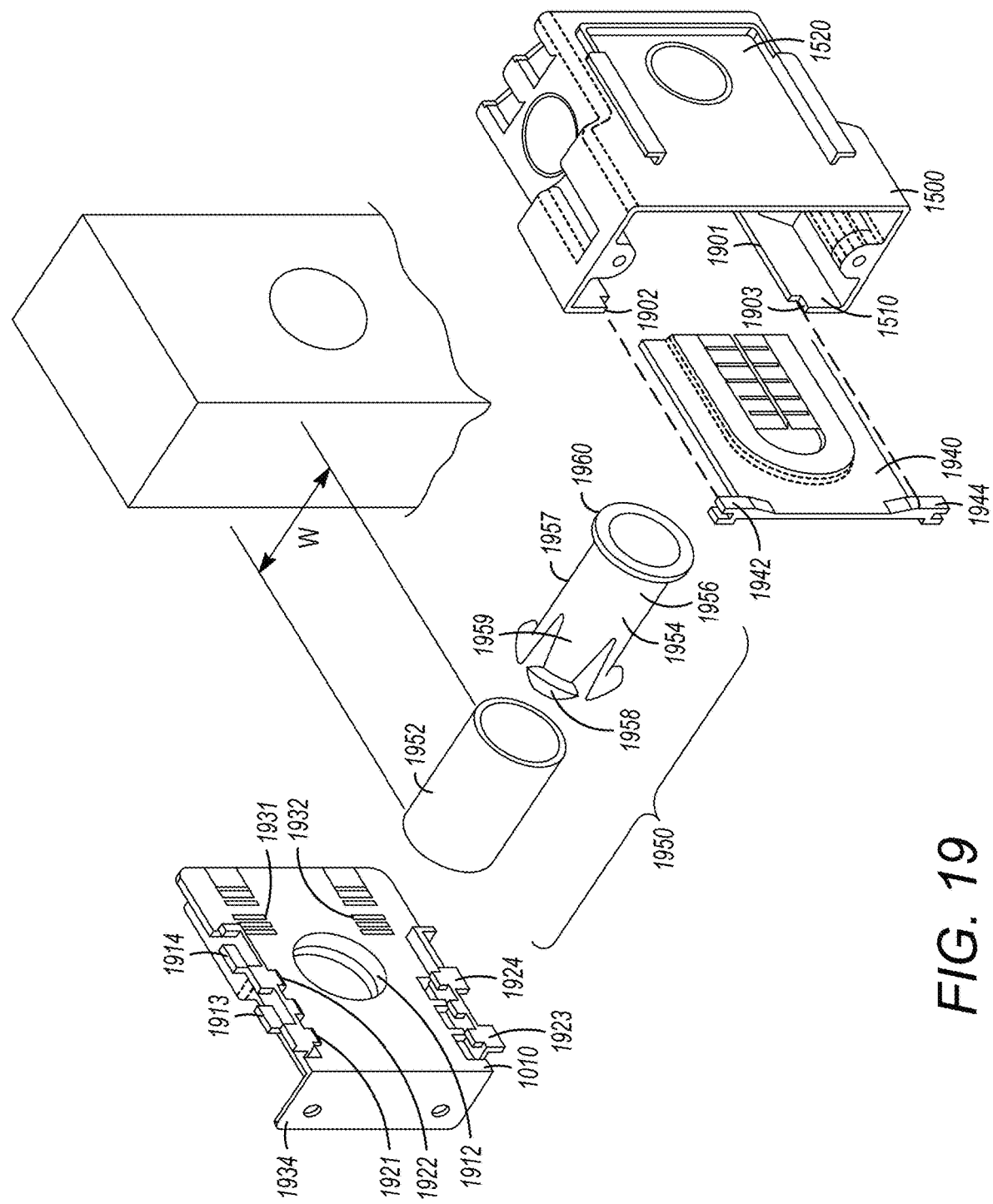
FIG. 19 is a side view of a electrical box and a side plate, according to another embodiment of the invention.

FIG. 19 is a side view of an electrical box 1500 and a box mount bracket 1910, and a side plate 1940, according to another embodiment of the invention. The box mount bracket 1910 engages the cut out on the first side 1510 of the electrical box 1500. The box mount bracket 1910 includes a mount opening 1912 therein. The box mount bracket 1910 has a major surface plane. The box mount bracket 1910 also includes a set of tabs 1913, 1914 which are offset from the major surface plane on a first side of the major surface of the box mount bracket 1910. The box mount bracket 1910 also has a second set of tabs 1921, 1922, 1923, 1924 which are offset on the second or other side of the major surface of the box mount bracket 1910. Also included in the major surface of the box mount bracket 1910, are a series of paired openings, such as 1931, 1932. The paired openings 1931 and 1932 are spaced to correspond to connector tabs 1514 on the first side 1510 of the box 1500 (shown in FIG. 15). The box mount bracket 1910 also includes an anti-rotation plate 1934 which is substantially perpendicular to the major surface of the box mount bracket 1910. The anti-rotation plate 1934 includes openings sized to receive fasteners, such as nails. The box mount bracket 1910 is sized to engage the edges 1901 and 1902 of the cut out in the first side 1510 of the box 1500. The edge 1901, 1902 is positioned between the tabs. One of the paired set of openings, such as 1931, 1932, is selected so that the front edge of the box 1500 is offset with respect to the anti-rotation plate 1934. The amount of offset is generally set so that the front of the box protrudes forward substantially equal to the thickness of the wall covering. For example, one of the sets of tabs results in the front face of the box 1500 being approximately 0.5 inches in front of the anti-rotation plate 1934. Sheet rock of a thickness of 0.5 inch can be placed on the wall and the front face of the electrical box will be substantially flush with respect to the surface of the sheetrock.

A mounting tube assembly 1950 is mountable to the mount opening 1912 of the box mount bracket 1910. The mounting tube assembly 1950 further includes a first tubular member 1952 having a length at least substantially equal to the width of a stud; and a second member 1954 fittable within the first tubular member 1952. The second member 1954 further includes a tubular main body 1956, a first end and, a second end. The first end includes a stop 1957. The first end and stop 1957 engaging the mount opening 1934 in the box mount bracket 1910. The second end of the mounding tube includes a slotted flange 1958. The second end of the mounting tube also has slots therein that extend through a portion of the slotted flange 1958 and through a portion of the tubular main body 1956 of the mounting tube assembly.

The areas between the slots forming at least two bendable fingers 1959 that bend to allow the second end to pass through the tubular first member 1952 as it is fitted to the first tubular member 1952. The box mount bracket 1910 includes a shoulder 1960 adapted to abut the sidewall of the box mount bracket 1910. The shoulder 1960 stops the mounting tube assembly 1950 from passing completely through the opening 1934. The slotted flange 1958 moves inward as the fingers 1959 of the second tubular member bend. The slotted flange 1958 has an outer diameter larger than the outer diameter of the first tubular member 1952.

The mount opening 1912 is cylindrical and has an axial axis. The shoulder 1960 is attached to a free end of the second tubular member 1954 and is substantially perpendicular to the axial axis of the mount opening 1912. The shoulder 1960 is adapted to substantially prevent rotation of the side plate. The tabs of the box mount bracket 1910 prevent rotation of the box mount bracket 1910. The shoulder 1960 has an outer diameter which is greater than the inner diameter of the mount opening 1912 of the box mount bracket 1910.

The electrical box 1500 also includes a slide bracket 1940. The box mount bracket 1910 can leave an opening in the electrical box 1500 when the box mount bracket 1910 is positioned to produce the offset of the nail place 1934 with respect to the front face of the electrical box 1500. The slide bracket includes a first ear 1042 and a second ear 1942. The ears 1941, 1942 engage notches 1903, 1904 in the edges of the opening in the first side 1510 of the electrical box 1500. The slotted flange, in one embodiment, has a diameter that is greater than the outer diameter of the first tubular member. The slide bracket 1940 has a length substantially equal to or slightly greater than the depth of the opening in the first side 1510 of the electrical box 1500. The side bracket 1940 will cover any opening left by the box mount bracket 1910. When installed, the side bracket 1940 extends along the length of the opening in the first side wall 1510 of the electrical box 1500. The ears 1942, 1941 attach to the notches 1904, 1903 when fully installed. The slide bracket 1940 also includes a series of tabs 1944, 1945 that appear as teeth along the inside of the slide bracket 1940. The pairs of tabs 1944, 1945 that look like teeth is actually a set of strain relief tabs that capture any wire, such as Romex or the like, that is passed through the tabs 1944, 1945. Typically, the wire will be passed through the mounting tube assembly 1950. The mounting tube assembly 1950 protects the wire from fasteners placed in a wall stud after installation of wall board or sheet rock.

The box mount bracket 1910 moves with respect to the electrical or insulative box 1500. The box 1500 is made of electrically insulative material, such as plastic, in one embodiment. The insulative box includes a set of tabs 1514 that engage the box mount bracket 1910 at various positions of the box mount bracket 1910 with respect to the insulative box. The box mount bracket 1910 moves with respect to the insulative box so that the insulative box 1500 can be moved to a plurality of positions flush with a finished wall. In this way, the setback distance can be adjusted so that the insulative box or electrical box 1500 is substantially flush with respect to the finished wall. The box mount bracket 1910 moves with respect to the insulative box, and the insulative box includes a set of locking tabs 1514 that engage the box mount bracket 1910 at one end of its travel. The electrical box 1500 accommodates a plurality of duplex electrical outlets. In one embodiment, the electrical box 1500 accommodates at least one duplex electrical outlet. In still another embodiment, the first tubular member 1952 is made of a material that resists penetration by a fastener. The first tubular member 1952 is made of material that has an exterior surface with a Rockwell Hardness Index in the range of 120 to 200. The first tubular member 1952 is made of a metal, ceramic or a composite of two or more materials or the like.

A box mount bracket 1910 is adapted to engage an electrical box 1500. The box mount bracket 1910 includes a mount which has a mount opening 1912 therein. A mounting tube or mounting tube assembly 1950 is mountable to the mount opening 1912. The mounting tube assembly 1950 further includes first tubular member 1952 having a length at least substantially equal to the width of a stud, and a second member 1954 fittable within the first tubular member 1952. The second member 1954 also includes a tubular main body, a first end including a stop 1957 and a second end including a slotted flange 1958. The first end and stop 1957 engages the mount opening 1957 in the box mount bracket 1910. The slots in the second end extend through a portion of the slotted flange 1958 and through a portion of the tubular main body. The areas between the slots form at least two bendable fingers 1959 that bend to allow the second end to pass through the tubular first member 1952 as it is fitted to the first tubular member 1952. In one embodiment, the tubular main body of the first tubular member 1952 is substantially equal to the width of a stud into which the mount assembly is adapted to pass. It should be noted that studs used in residential housing are generally wooden 2×4's and 2×6's. These studs, when dry, are typically 1.5 inches in width. It should be noted that the width of studs can be varied and this invention is not limited to use in a typical residential application. The invention could be used on steel "2×4's" used in commercial construction for example. The mounting assembly 1950 and box mount bracket 1910 made of material so that the mounting assembly 1950 can support an electrical box 1500 after the mounting assembly 1950 is positioned in a support.

Figure 20:
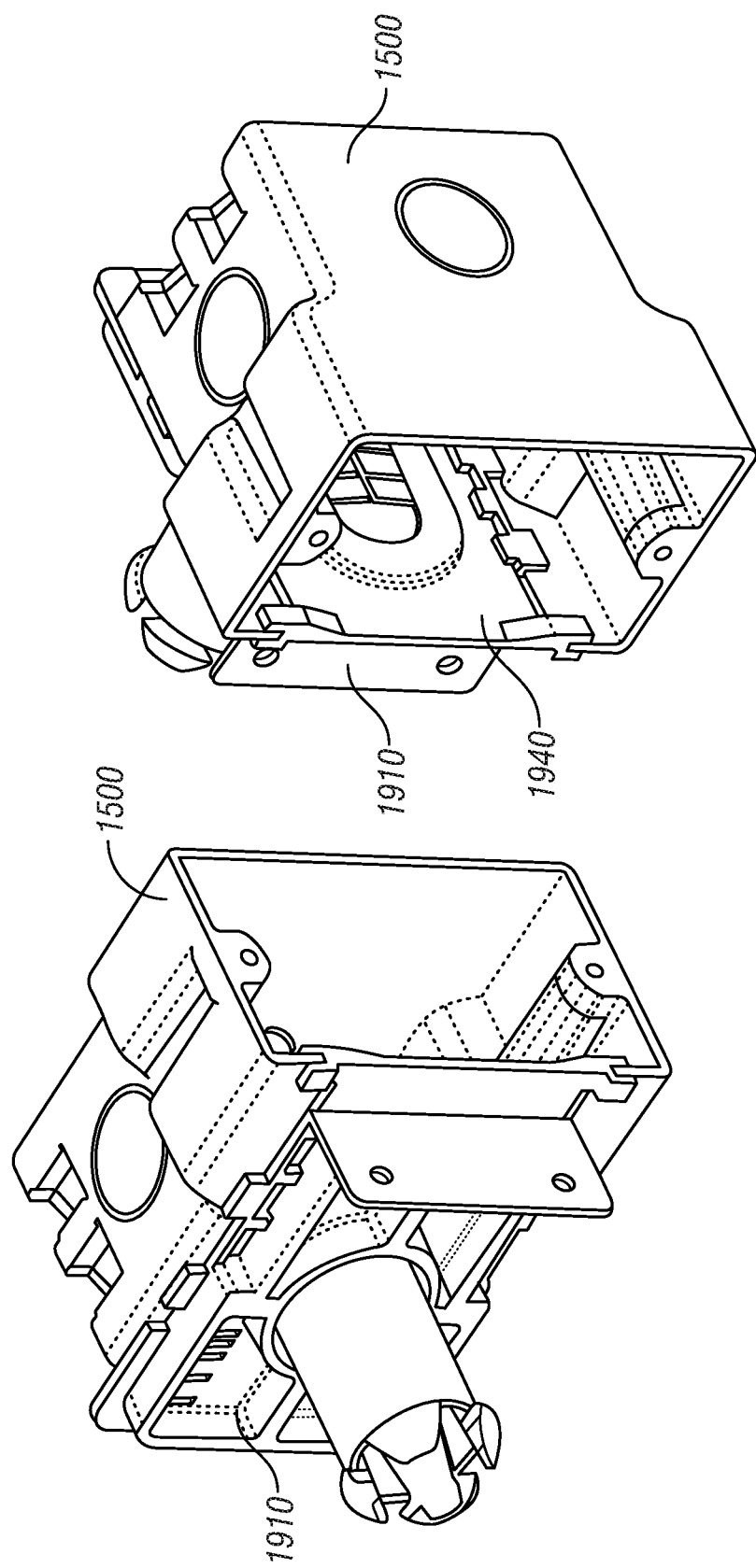
FIG. 20A is a perspective view of the box as assembled with the box mount bracket, mounting tube or mounting tube assembly, and slide bracket.
FIG. 20B is another perspective view of the box as assembled with the box mount bracket, mounting tube or mounting tube assembly, and slide bracket.

FIG. 20A is a perspective view of the box 1500 as assembled with the box mount bracket 1910, mounting tube or mounting tube assembly 1950, and slide bracket 1940. FIG. 20B is another perspective view of the box 1500 as assembled with the box mount bracket 1910, mounting tube or mounting tube assembly 1950, and slide bracket 1940.

Most generally, the electrical box system can be thought of as including a base electrical box, and an end portion. The end portion is added to the base electrical box to substantially complete the electrical box. In some embodiments, the electrical box includes at least one intermediate portion that is added to complete the electrical box. The at least one intermediate portion, in some embodiments, is placed between the base electric box and the end portion which is added to the electrical box. In some embodiments, the intermediate portion is placed between the base electrical box and the end portion. In some embodiments, the intermediate portion is placed after the end portion has been attached to the base. In other embodiments, the intermediate portion is added or attached to the base before the end portion is added to complete the electrical box. In some embodiments, there can be one or more intermediate portions that do not directly connect to the base or the end portion. The box is literally built to size out in the field. In some embodiments, the resulting box has a size to accommodate a single gang electrical component. In other embodiments, the resulting box has a size to accommodate a plurality of single gang electrical components. This is generally referred to as a multiple gang box or a 2 gang, 3 gang, 4 gang, etc. sized electrical box. In another embodiment, at least some of the intermediate portions are substantially identical parts. In still further embodiments, at least one or some of the intermediate portions are substantially identical to the base electrical box.

Figure 32:
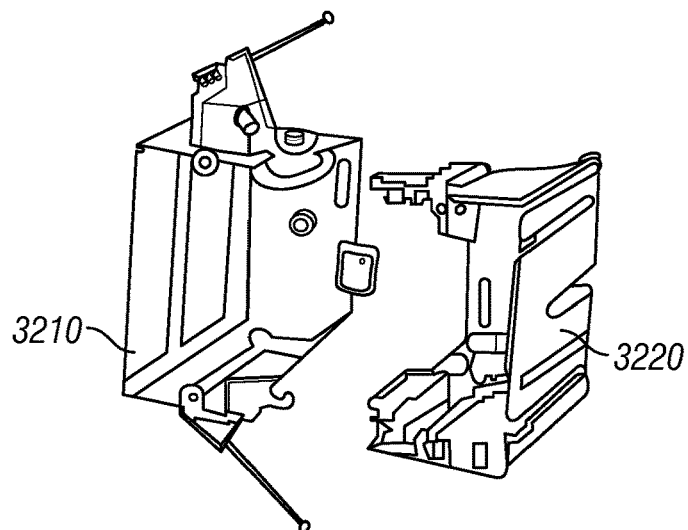
FIG. 32 is a perspective view of an alternative box and an end portion, according to an example embodiment.
Figure 33:
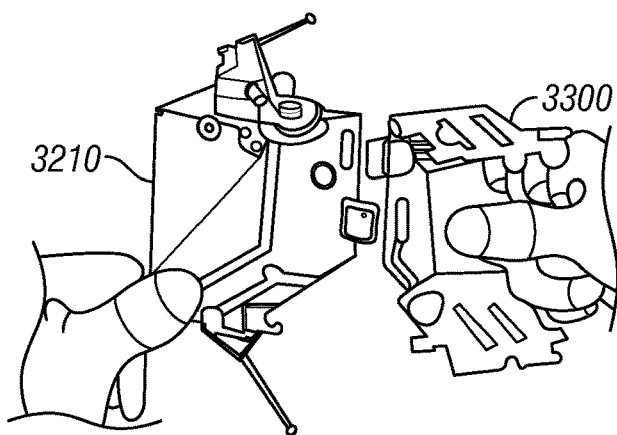
FIG. 33 is a perspective view of an alternative box and an intermediate portion, according to an example embodiment.
Figure 34:
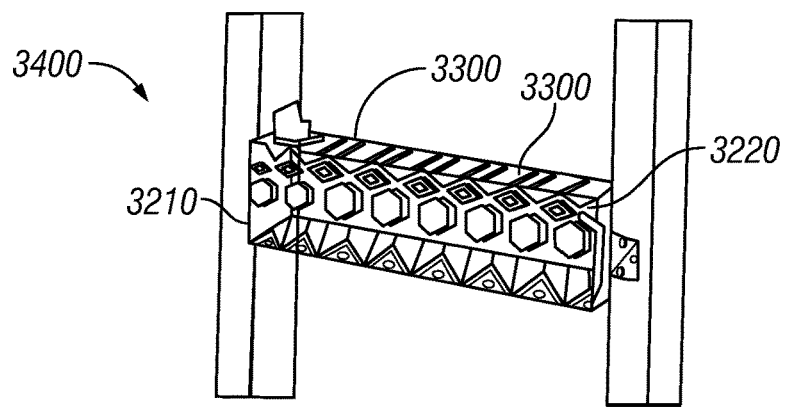
FIG. 34 is perspective view of an alternative box, a plurality of intermediate portions and an end portion assembled into a multiple gang electrical box, according to an example embodiment.

Various embodiments are detailed as discussed and illustrated in FIGS. 17-20A Yet another embodiment of such as system is shown in FIGS. 32-34. FIG. 32 is a perspective view of an alternative box 3210 or base, and an end portion 3220, according to an example embodiment. FIG. 33 is a perspective view of an alternative box 3210 and an intermediate portion 3300, according to an example embodiment. FIG. 34 is perspective view of an alternative box 3210, a plurality of intermediate portions 3300 and an end portion 3220 assembled into a multiple gang electrical box 3400, according to an example embodiment. In this embodiment, a multiple gang box can be custom made from a base or alternative box 3210, any number of intermediate portions 3300 and an end portion 3220. The intermediate portions 3300 are fit to the base or alternate box 3210 and to one another to form the multiple gang box 3400 shown in FIG. 34. This is similar to the previously discussed system. Among the differences is that the intermediate portion 3300 differs from the base or alternative box portion 3210. This system also allows the construction person to construct boxes from fewer parts and therefore allows the person in the field to have to carry fewer parts when compared to carry a number of various gang number boxes. The embodiment detailed in FIGS. 17-20A has the advantage that the base box and the intermediate part is substantially similar or the same.

Figure 21:
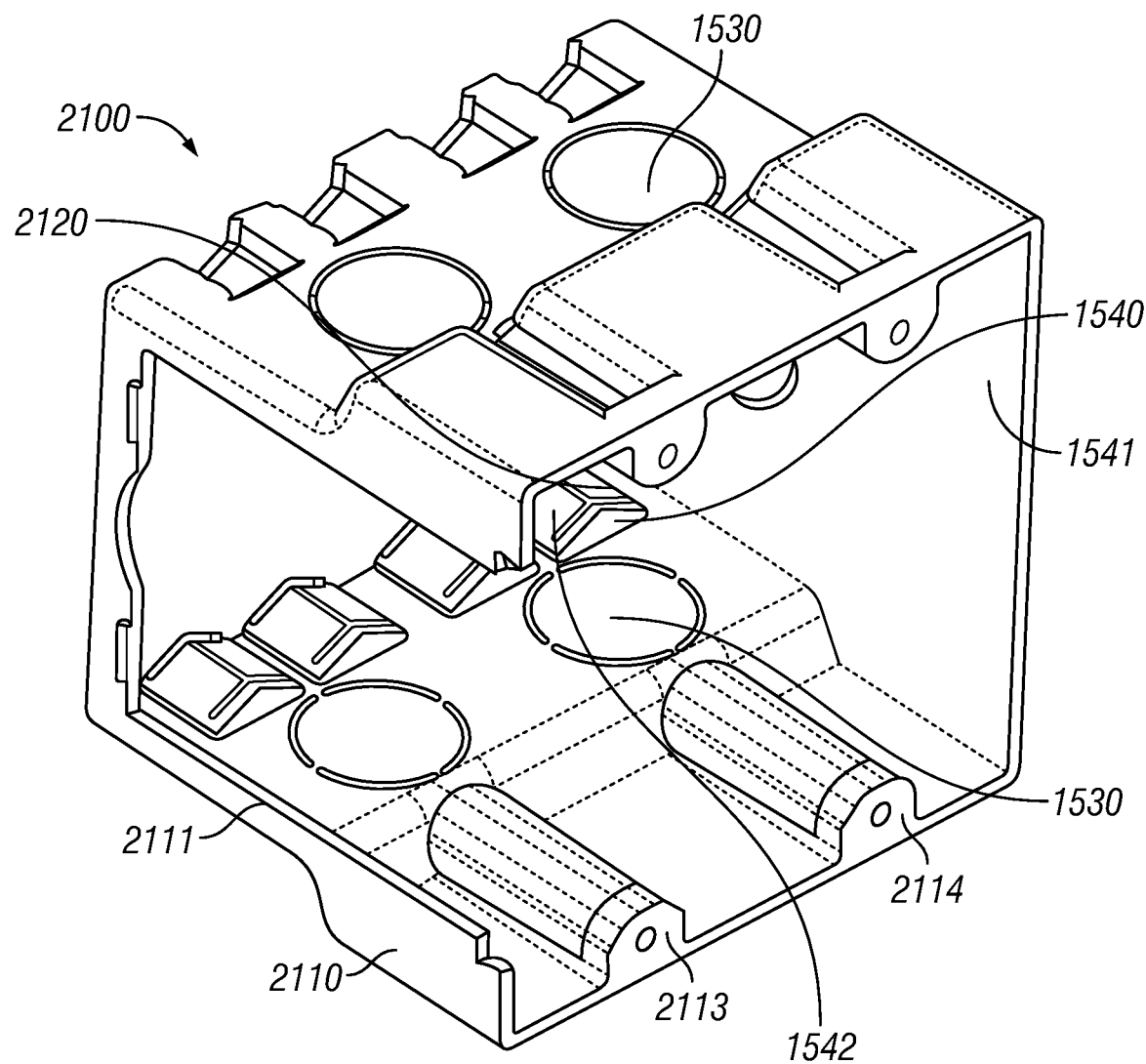
FIG. 21 is a perspective view of an electrical box for accommodating at least two duplex electrical outlets, according to an example embodiment.

FIG. 21 is a perspective view of an electrical box 2100 for accommodating at least two duplex electrical outlets, according to an example embodiment. The electrical box 2100 includes a first side 2110 having a mount opening 2111 therein, and a second side 2120. The mount opening 2111 is adapted to receive a mounting system 1550 that includes the box mount bracket 1910, mounting tube or mounting tube assembly 1950, and slide bracket 1940. The electrical box without the additional components or elements is shown in FIG. 21. The electrical box 2100 shown in FIG. 21 includes a location 2113 for a first duplex electrical outlet and a location 2114 for a second duplex electrical outlet. Many of the components and features of the electrical box 2100 are substantially similar to the electrical box 1500 discussed above. The elements of the electrical box 2100 which are similar or substantially the same will carry the same number as the electrical box 1500. Furthermore, rather than redescribe the same features again, the specification will key in on at least some of the differences between the box 2100 and the box 1500. Among the differences is that the electrical box 2100 is wider than the electrical box 1500. The electrical box 2100 has several more punch plates 1530 (two additional punchouts) associated with the additional location 2114. The additional location 2114 also includes four more of openings 1540 for receiving wire so that the installer has a number to choose from. Each additional opening for receiving wire 1540 further includes a first angled strain relief tab 1541, and a second angled strain relief tab 1542. The first angled strain relief tab 1541 and the second strain relief tab 1542 positioned near the opening for receiving wire. Each of the first angled strain relief tab 1541 and the second angled strain relief tab 1542 has a free end. The free ends of the tabs are not connected. In the embodiment shown, the free ends located near each other. This allows the installer to select a wire port for the duplex electrical outlet installed at the second location 2114. Yet another difference is that the exterior portion of the second wall 2120 can either carry the same features at the exterior portion of the second wall 1520 of electrical box 1500. In an alternative embodiment, the box 2100 is devoid of these features.

Figure 22B:
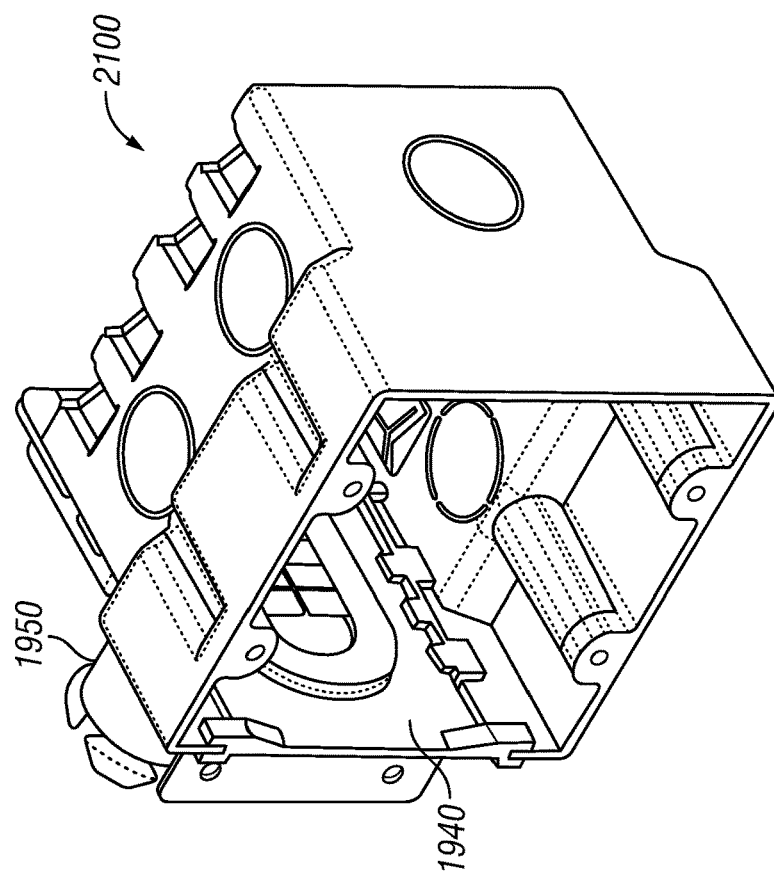
FIG. 22B is another perspective view of the box as assembled with the box mount bracket, mounting tube or mounting tube assembly, and slide bracket, according to an example embodiment.
Figure 22A:
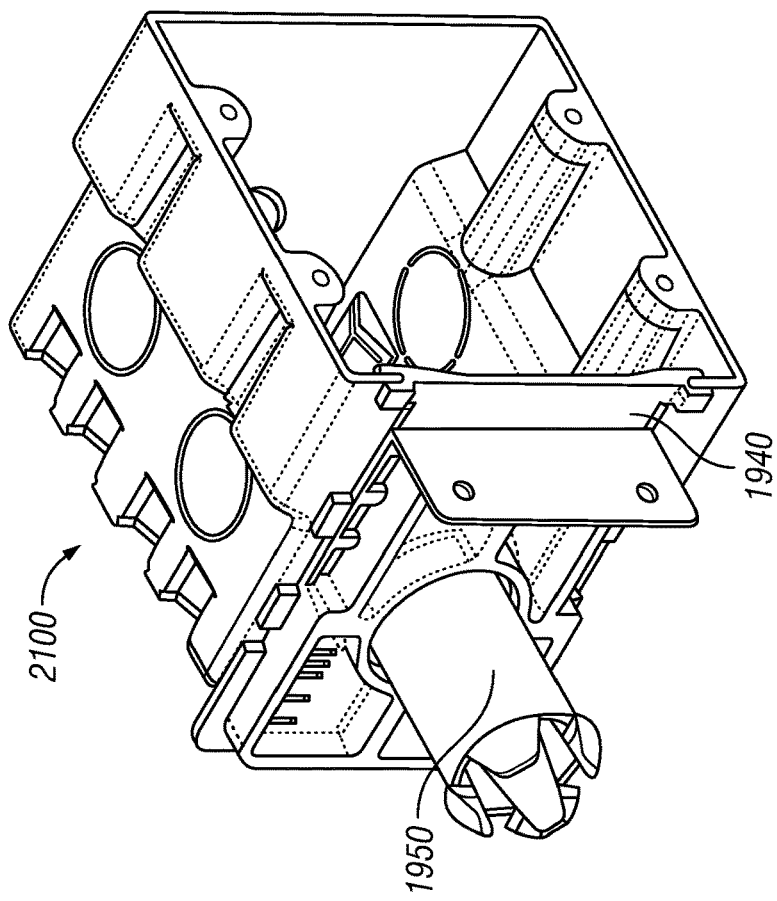
FIG. 22A is a perspective view of a box as assembled with the box mount bracket, mounting tube or mounting tube assembly, and slide bracket, according to an example embodiment.

FIG. 22A is a perspective view of the box 2100 as assembled with the box mount bracket 1910, mounting tube or mounting tube assembly 1950, and slide bracket 1940. FIG. 22B is another perspective view of the box 2100 as assembled with the box mount bracket 1910, mounting tube or mounting tube assembly 1950, and slide bracket 1940. The with the box mount bracket 1910 is attached and adjusted in the same way as discussed with respect to electrical box 1900. The mounting tube or mounting tube assembly 1950 of the electrical box 2100 is installed in substantially the same way. The slide bracket 1940 completes the adjustable box 2100. The box 2100 can be adjusted so that it mounts flush with various thicknesses of wall board.

Many embodiments are envisioned. For example, boxes could be manufactured with various numbers of gangs and include the openings for receiving the mounting tube assembly 1950 and the slide bracket 1940.

Figure 23:
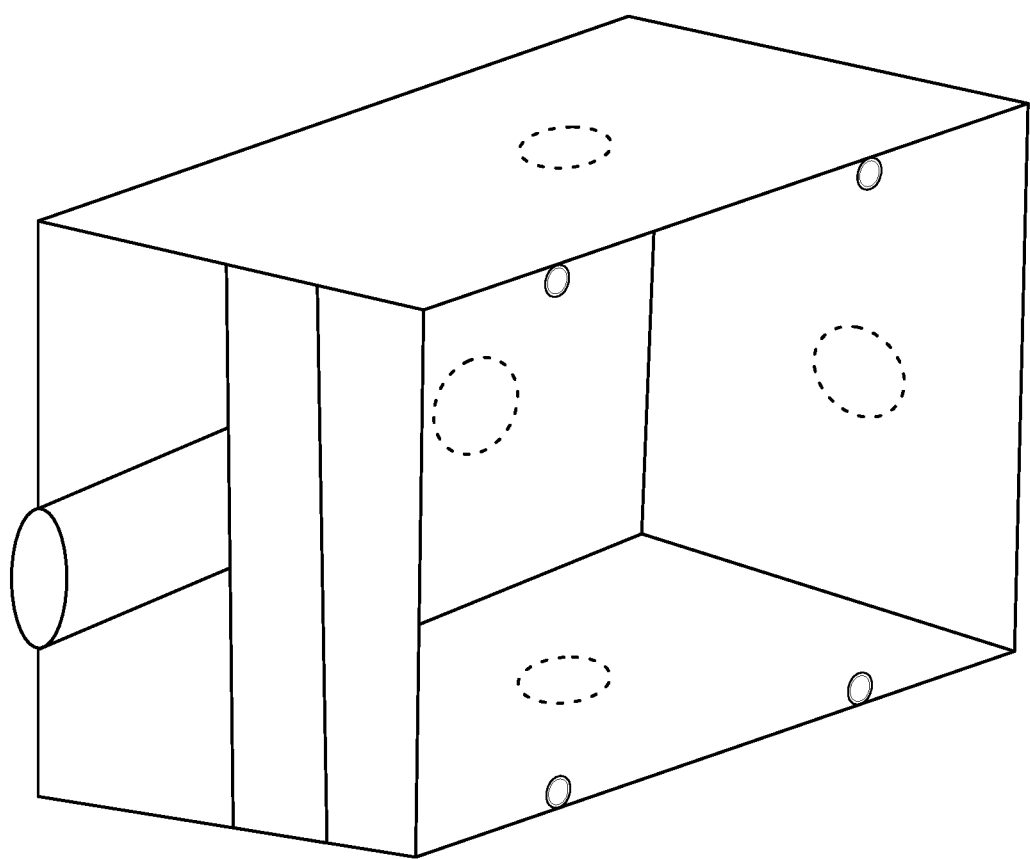
FIG. 23 shows a two gang box having a fixed offset and an opening for the mounting tube assembly 1950, according to another example embodiment.

It is also contemplated that a boxed with a fixed mounting tube assembly could be manufactured with any number of gangs. FIG. 23 shows a two gang box having a fixed offset and an opening for the mounting tube assembly 1950, according to another example embodiment. The offset of the mounting tube assembly would be fixed. The depth of the recess would not be adjustable. Most likely, contractors and the like would carry the most commonly used boxes in their inventory. For example, if a contractor did mostly residential work he or she might stock one and two gang boxes with a fixed 0.5 inch offset. The box would have anti-rotation plate 0.5 inch from the front face of the box and also would have an opening for receiving the mounting tube assembly 1950 molded into the box.

The mounting tube would be mountable to the mount opening. The mounting tube further includes a first tubular member having a first length, and a second member fittable within the first tubular member. The second member further includes a tubular main body including a tubular portion fittable within the first tubular member. The second member has a first end including a stop, and a second end including a slotted flange. The stop of the first end engages the mount opening in the second side of a box, which in some embodiments may be non adjustable. The slotted flange of the second end has slots therein that extend through a portion of the slotted flange and through a portion of the tubular main body. The areas between the slots forming at least two bendable fingers that bend to allow the second end to pass through the tubular first member. The box can be multiple sizes. The electrical box may be sized to accommodate at least one duplex electrical outlet, at least two duplex electrical outlets, at least three duplex electrical outlets, or more. In sum, the box can be sized to fit one or a plurality of duplex electrical outlets. The first tubular portion of the electrical box is made of a material that resists puncture by a fastener. In one embodiment, the first tubular portion is made of a metal that resists puncture by a fastener. The mounting tube, in one embodiment, is separable from the second side of the box. In other words, the mounting tube is removably mounted to the second side of the box. It can be attached in a secure fashion and removed and remounted. The electrical box also includes at least one strain relief opening having a first canted portion and a second canted portion. A free end of the first canted portion is positioned near a free end of the second canted portion. The electrical box can also include punch outs.

An electrical box for accommodating at least one duplex electrical outlet includes a first side, a second side, and a mounting tube attached to one of the first side or the second side. The mounting tube further includes a first tubular member having a first length, and a second member fittable within the first tubular member. The second member further comprises a tubular main body including a tubular portion fittable within the first tubular member. The tubular member includes a first end attached to one of the first side or the second side of the electrical box, and a second end including a slotted flange. The second end has slots therein that extend through a portion of the slotted flange and through a portion of the tubular main body. The areas between the slots form at least two bendable fingers that bend to allow the second end to pass through the tubular first member. The electrical box, in different embodiments, accommodates one duplex electrical outlet, at least two duplex electrical outlets, or at least three duplex electrical outlets. In other words, the electrical box can accommodate one or a plurality of duplex electrical outlets. The first tubular portion is made of a material that resists puncture by a fastener. The first tubular portion is made of a metal, such as steel. Other materials can include a ceramic or composite material. The first tubular member can be formed with various lengths for different applications. In one embodiment, the first tubular member has a first length for adapted to extend through at least the thickness of one stud. The first tubular member can also be a length adapted to extend through at least the thickness of two studs, three studs or a plurality of studs.

Figure 24:
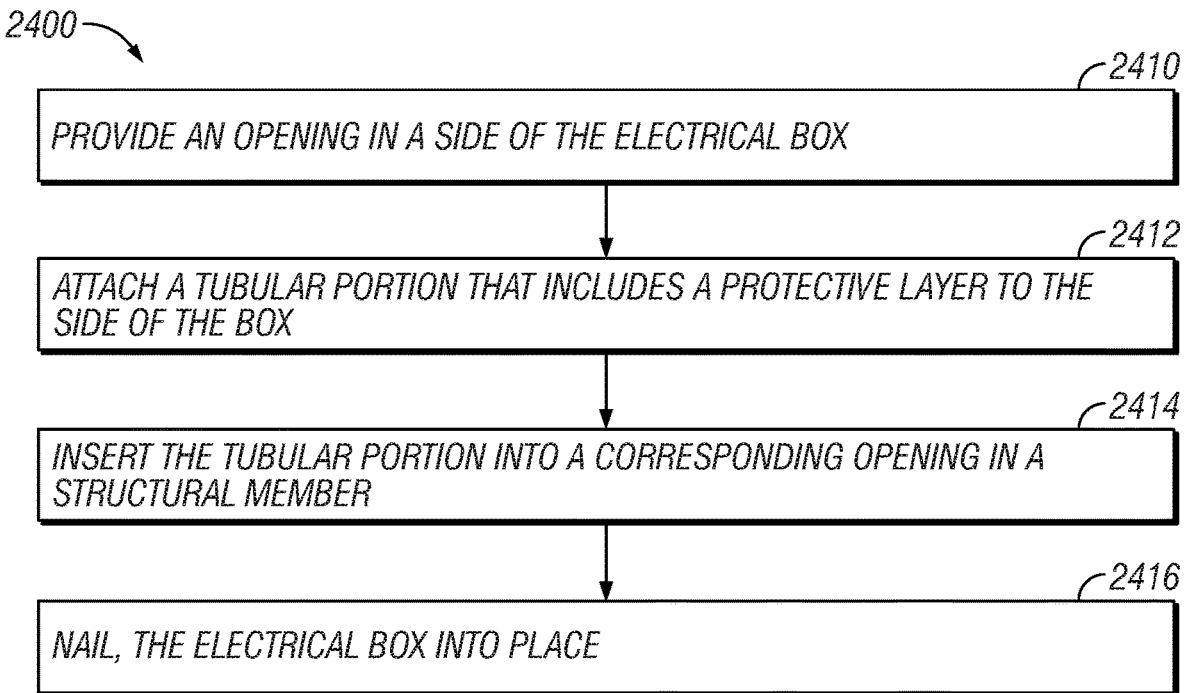
FIG. 24 is a flow chart for a method of mounting an electrical box, according to an example embodiment.

FIG. 24 is a flow chart for a method 2400 of mounting an electrical box, according to an example embodiment. The method 2400 for mounting an electrical box includes providing an opening in a side of the electrical box 2410, attaching a tubular portion that includes a protective layer to the side of the box 2412, and inserting the tubular portion into a corresponding opening in a structural member 2414. In some embodiments, the electrical box is nailed into place 2416.

Figure 25:
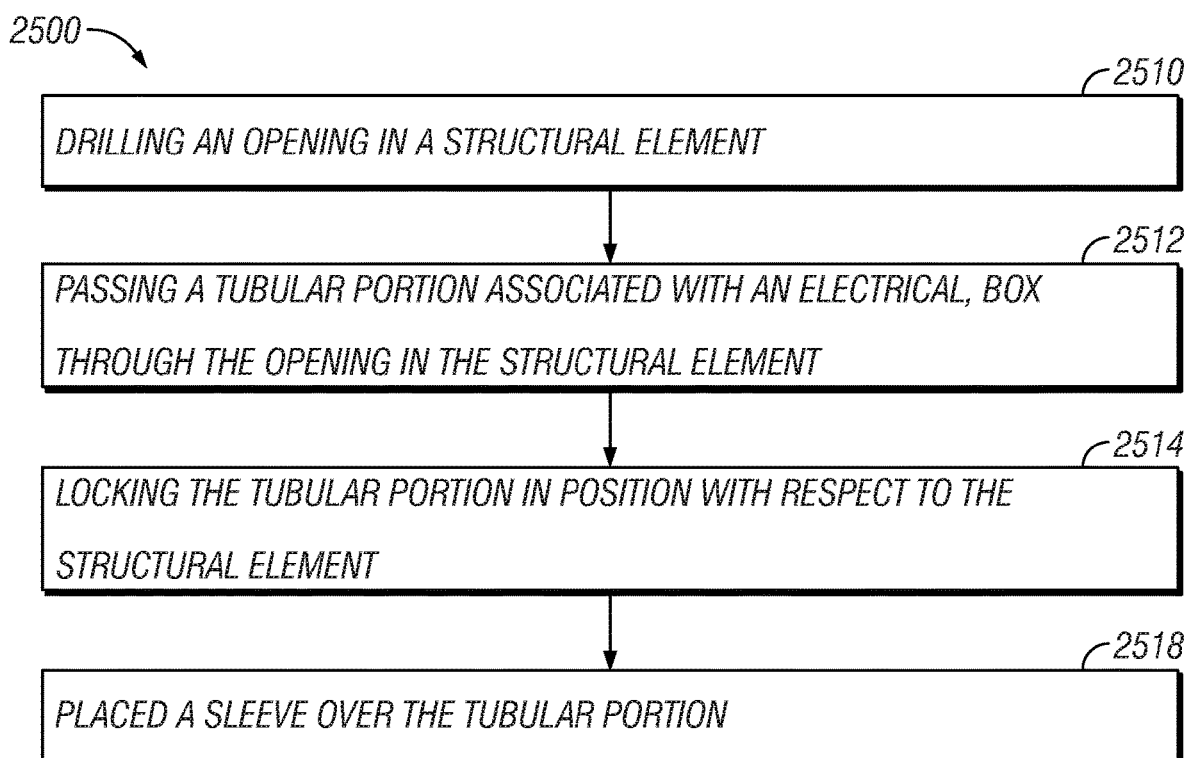
FIG. 25 is a flow chart for a method of mounting an electrical box to a structural element of a building, according to an example embodiment.

FIG. 25 is a flow chart for a method 2500 of mounting an electrical box to a structural element of a building, according to an example embodiment. The method 2500 for mounting an electrical box to a structural element of a building includes drilling an opening in a structural element 2510, passing a tubular portion associated with an electrical box through the opening in the structural element 2512, and locking the tubular portion in position with respect to the structural element 2514*t*. A sleeve can be placed over the tubular portion 2518. The sleeve can be made of a material that resists puncture by a fastener. The sleeve can be a metallic material, a ceramic material, of a composite material. The tubular portion can be affixed or attached to the electrical box in any manner. In another embodiment, the tubular portion is constructed to connect to the electrical box. In still another embodiment, the tubular element interacts with the electrical box, and supports the electrical box. The tubular element is made of sufficiently strong material and designed so that an electrical box can be supported on one end of the tubular element. The electrical box is cantilevered off of one end of the tubular element.

Figure 26:
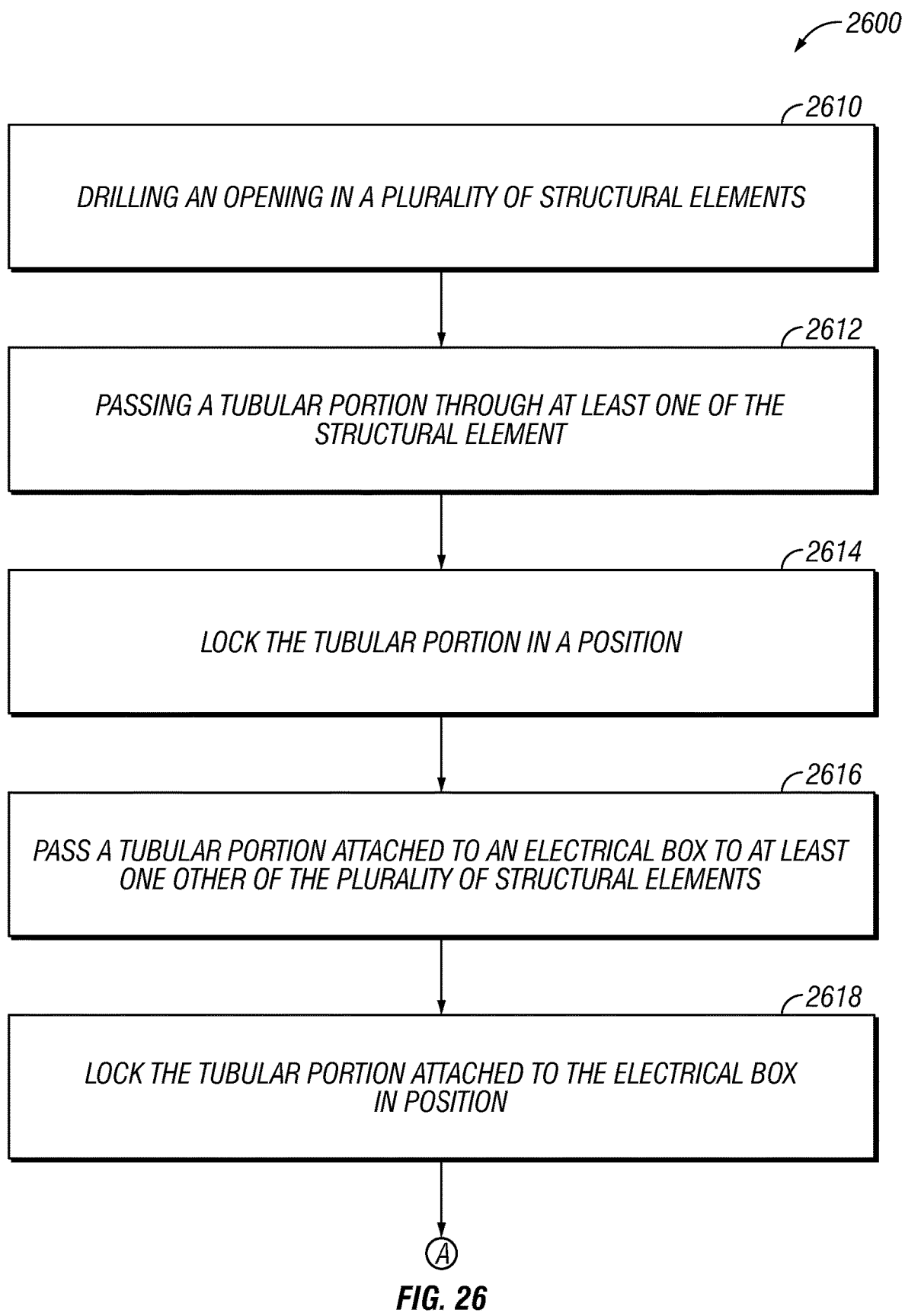
FIG. 26 is a flow chart for a method of wiring a building or edifice, according to an example embodiment.
Figure 26:
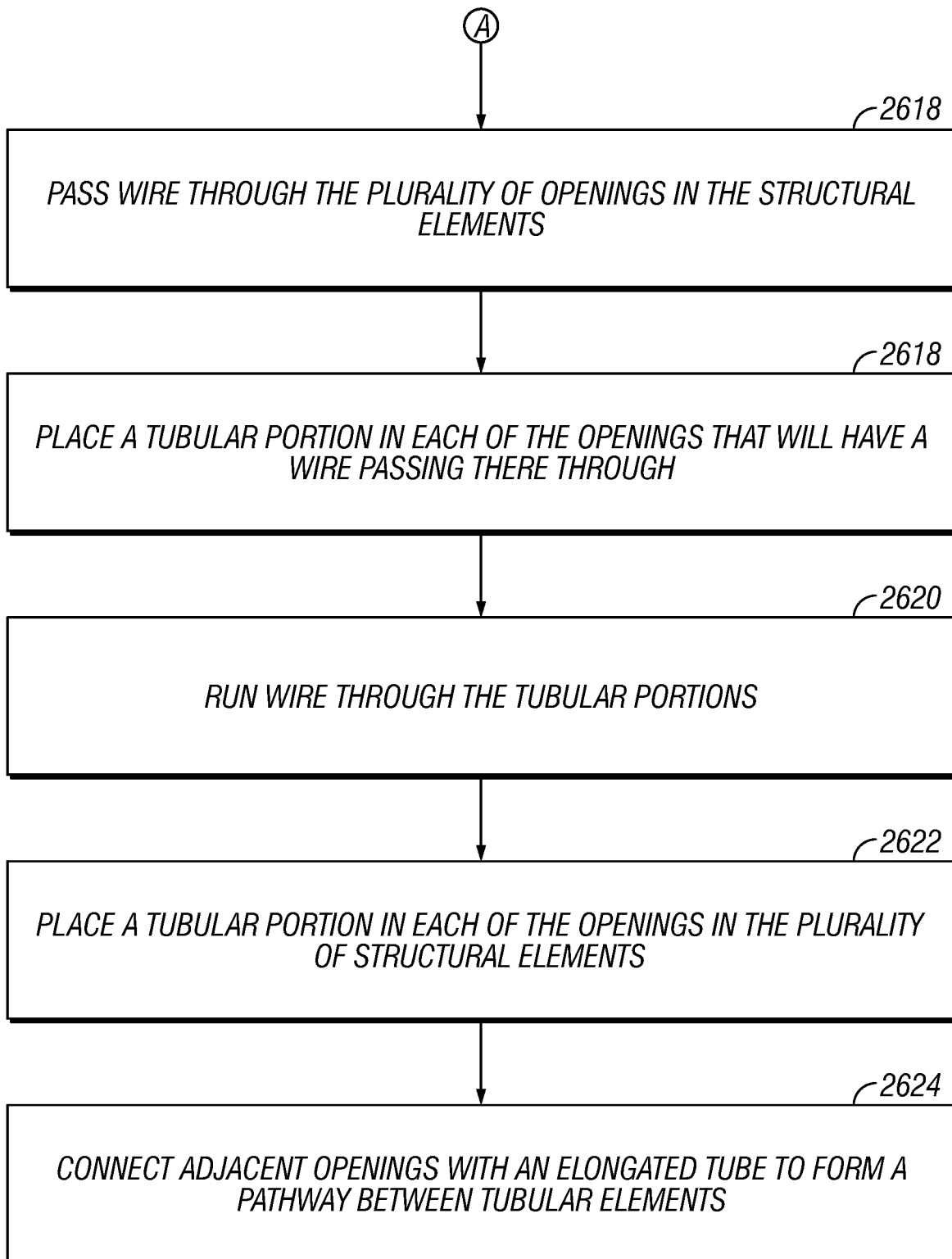

FIG. 26 is a flow chart for a method 2600 of wiring a building or edifice, according to an example embodiment. The method 2600 of wiring an edifice includes drilling an opening in a plurality of structural elements 2610, passing a tubular portion through at least one of the structural elements 2612, locking the tubular portion in a position 2614, passing a tubular portion attached to an electrical box to at least one other of the plurality of structural elements 2616, and locking the tubular portion attached to the electrical box in position 2618. The method 2600 further includes passing wire through the plurality of openings in the structural elements 2618. Drilling an opening in a plurality of structural elements includes placing the openings at substantially the same level in each of the plurality of structural elements. Some embodiments employ a jig to place the openings at substantially the same level in each of the plurality of structural elements, and to place the openings at a substantially equal distance from an exposed edge of the structural elements. The jig also aids in placing the openings at a substantially equal distance from an exposed edge of the structural elements, and in making the plurality of openings substantially perpendicular to the plurality of structural elements. The jig, in some embodiments includes an adjustable leg which can be adjusted and fixed at a height above the floor or above a base board. The jig can be used so that a plurality of openings in the structural elements are at substantially the same distance above a floor. In some embodiments, the jig is provided with a device for following a line. A line is formed at a set distance from a reference point. For example, the line can be formed at a distance above a floor or a reference point on the floor. The line can also be leveled with a level. A chalk line can be snapped to form a set of lines across a structural such as a plurality of studs that form a wall in an edifice. In another embodiment the line can be formed using a laser beam. This would "mark" the height on the structural element. As mentioned, the line on the structural elements are formed at substantially the same distance above a floor. This may be useful for complying with electrical code laws in various localities. The jig can also include a feature for aligning to the line formed on a structural element. In another embodiment, the method 2600 further includes placing a tubular portion in each of the openings that will have a wire passing therethrough 2618, and running wire through the tubular portions 2620. In still another embodiment, the method 2600 includes placing a tubular portion in each of the openings in the plurality of structural elements 2622, connecting adjacent openings with an elongated tube to form a pathway between tubular elements 2624, and running wire through the tubular elements and the elongated tubes. In one embodiment, the tubes are spring loaded so that the length can be shortened for installation. The spring elongating the tube to engage the tubular portions to complete the installation.

Figure 27:
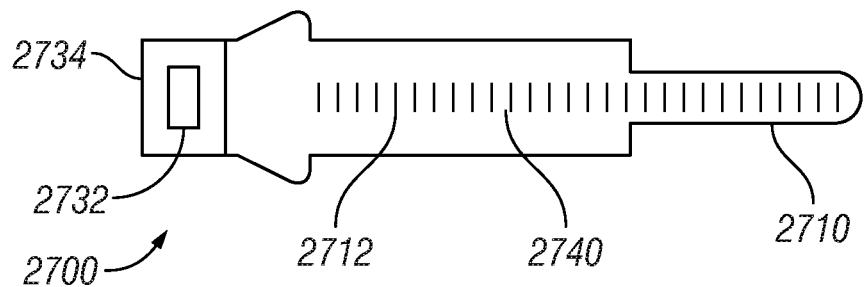
FIG. 27 is top view of a tie for holding an electrical wire or a plurality of electrical wires, according to an example embodiment.
Figure 28:
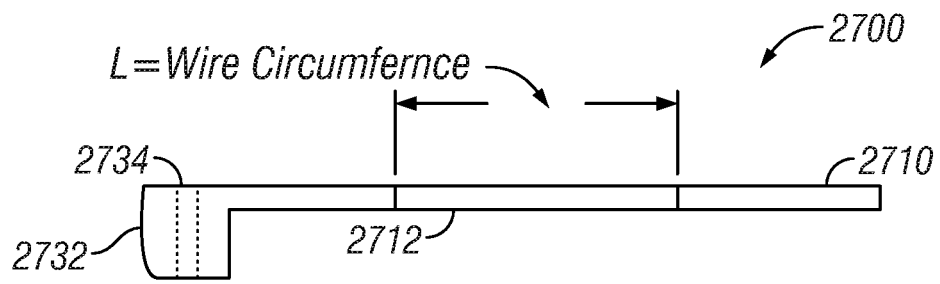
FIG. 28 is side view of a tie holding an electrical wire or a plurality of electrical wires (not shown), according to an example embodiment.
Figure 29:
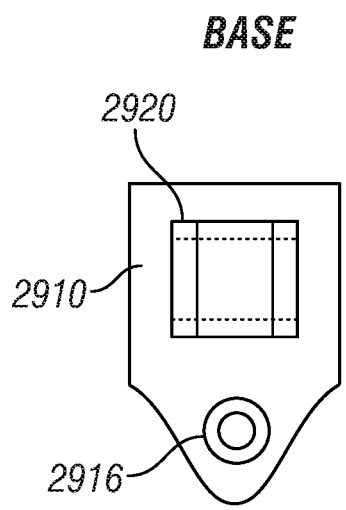
FIG. 29 is a top view of a base, according to an example embodiment.
Figure 30:
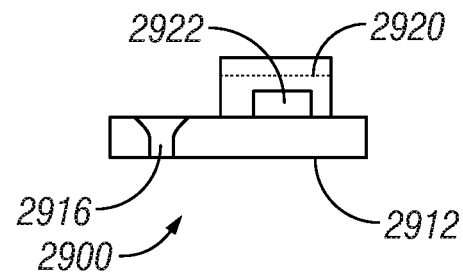
FIG. 30 is a side view of a base, according to an example embodiment.

FIG. 27 is top view of a tie 2700 for holding an electrical wire or a plurality of electrical wires, according to an example embodiment. FIG. 28 is side view of a tie 2700 holding an electrical wire or a plurality of electrical wires (not shown), according to an example embodiment. FIG. 29 is a top view of a base 2900, according to an example embodiment. FIG. 30 is a side view of a base 2900, according to an example embodiment. Now referring to FIGS. 27, 28, 29 and 30, the tie and base will be further detailed. The base 2900 includes a base surface 2910. The base surface 2910 includes a substantially flat surface 2912. The base also includes a surface 2914 opposite the substantially flat surface 2912. The surface 2914 includes a fastener opening 2916 therein. The surface 2914 also includes an upright 2920 that has an opening 2922 therein. The opening 2922 can also be termed as a tie opening. The opening is sized to receive a portion of the tie 2700. The base is attached to a structural element in the absence of electrical wire. This lessens the chance that the electrical wire might be damaged.

The tie 2700 for holding electrical wire (not shown) includes a base engaging portion 2710 and a wire or multiwire engaging portion 2712. The wire engaging portion 2712 has a length substantially equal to the circumference of the wire or multiple wire package used in wiring. One example of multiwire package is Romex. Several wires are included and wrapped in a sheath of thin, flexible material. The base 2900 includes a tie opening 2922 therein. The zip tie 2700 is adapted to hold wire, such as Romex wire with the wire engaging portion 2712. Put another way, the zip tie 2700 further includes a first portion 2712 having a first width, and a second portion 2710 having a second width lesser than the first width. The tie opening 2922 in the base 2900 is sufficient to allow the second portion 2710 of the tie 2700 to pass therethrough, but too small to allow the first portion 2712 of the tie 2700 to pass therethrough. The tie 2700 also includes a connector 2732 on the free end 2734 of the first portion 2712 sized to receive the second portion 2710 of the tie 2700. The connector 2732 includes a pawl like extension or pawl like teeth internal to the connector 2732. The zip tie 2700 includes a plurality of ridges 2740 that engage the pawl like teeth in the connector 2732. The pawl like portion of the connector engages at least one of the plurality of ridges 2740. The ridges 2740 run substantially down the length of the zip tie 2700, in one embodiment. At least the second portion 2710 includes a plurality of ridges transverse to the length of the second portion. In other words, the ridges cross the width of at least the second portion 2710 of the zip tie 2700. Put another way, the connector includes a ratcheting mechanism for attaching to at least one of the plurality of ridges on the second portion 2710 of the tie 2700. The first portion 2712 of the tie has a length substantially equal to the outside circumference of the electrical wire. In this way, the outer portion of the wire may be more fully supported by the increased width. The fastener or connector in the base 2910, in one embodiment is a screw. In another embodiment, the fastener is a sheet metal screw that can be used in wooden studs, commonly used in residential building, and that can be used in metal studs, more commonly used in commercial building. The fastener can be retained with the tie 2700, in some embodiments. In this way, a user does not need to find a separate fastener when picking up a tie 2700 to use. This saves time during installation and routing of wires, such as romex style wire. In one embodiment, a screw which is installed in the fastener opening 2712 so that the screw can be turned during installation and will not fall out. More specifically, the screw has an unthreaded portion near the head of the screw. The unthreaded portion has a length or width slightly more than the thickness of the base 2710. With an unthreaded portion of a length or width slightly more than the thickness of the base, the screw can turn freely while being held within the opening. The screw head and the threads retain the screw, in one embodiment.

Figure 31:
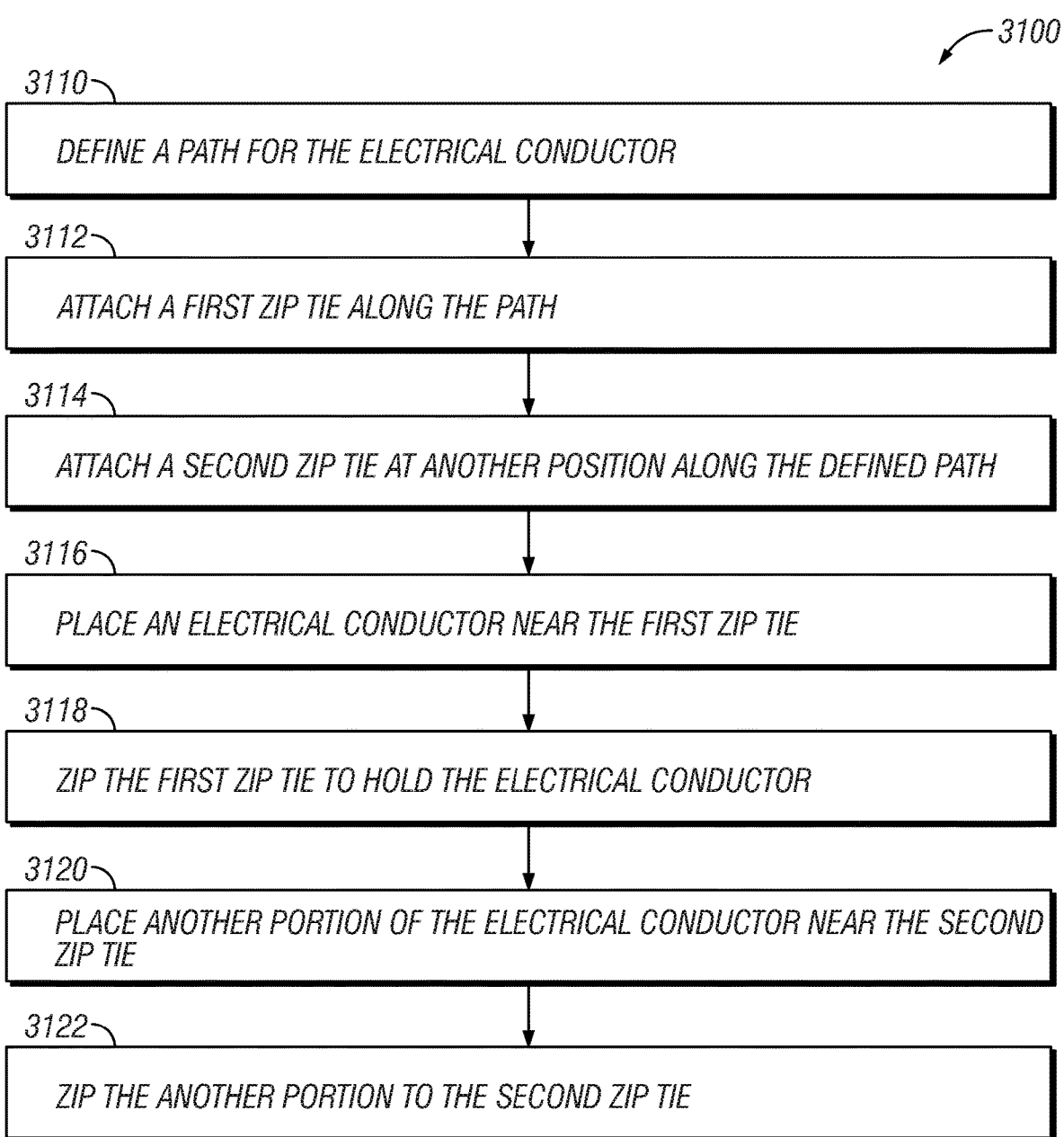
FIG. 31 is a flow diagram of a method for holding an electrical conductor, according to an example embodiment.

FIG. 31 is a flow diagram of a method for holding an electrical conductor, according to an example embodiment. The method 3100 for holding an electrical conductor includes defining a path for the electrical conductor 3110, attaching a first zip tie along the path 3112, and attaching a second zip tie 3114 at another position along the defined path. It should be noted that the path does not have to be followed exactly or precisely. The method 3100 also includes placing an electrical conductor near the first zip tie 3116 and zipping the first zip 3118 tie to hold the electrical conductor. Another portion of the electrical conductor is placed near the second zip tie 3120 and zipped to the second zip tie 3122 to hold the other portion of the electrical conductor. The path can include a plurality of these types of ties. The zip tie is attached before the wire is attached. In other words, attaching the device to a structure is done without having the wire nearby. This reduces the chance of failure caused by striking the conductor inadvertently during installation. In prior art methods, a staple like device holding two nails is placed over the Romex wire and then the nails are pounded into place. A slip of the hammer can damage the internal wires.

The first zip tie includes a fastener portion for receiving and retaining a fastener. Similarly, the second zip tie also includes a fastener portion for receiving and retaining a fastener. The fastener can be a nail or a screw or the like. In one embodiment, the fastener is a sheet metal screw. The sheet metal screw can be used to attach to various building materials, such as wood used in residential applications and metal more commonly used in commercial applications. Attaching the first zip tie along the path includes placing the fastener portion on a structure and turning the screw. Similarly, attaching the second zip tie along the path includes placing the fastener portion on a structure and turning the screw. The zip ties have a narrow width associated with the fastener portion and a wide width associated with the portion for holding the electrical conductor. The wider portion distributes the force over a larger area and lessens the possibility that one conductor with insulation might be forced into electrical contact with another conductor. The wider portion cradles the electrical wire or electrical wires. For example, in a Romex type conductor which holds three conductors (positive, negative and ground), the conductors are cradled with a lesser pressure since the force is distributed over a larger area. This provides for a safer installation of the wire set.

A system for holding an electrical conductor (not shown) includes a first base 2900 attached to a structure, and a second base 2900 attached to the structure. The first and second bases 2900 are attached along a path for an electrical conductor. Both the first and second bases receive the narrow portion 2710 of the zip ties 2700. This leaves the wider portion 2712 open to receive the electrical conductor. The electrical conductor is attached to the bases 2900 after being attached to the structure. In other words, when the electrical conductor is attached the structure, the wide portion 2712 of the zip ties 2700 are open so that the electrical conductor can be received or cradled therein. Once the electrical conductor is placed in the first and second zip tie 2700, and zipped, a first electrical conductor portion is held by the first zip tie 2700, and a second electrical conductor portion held by the second zip tie 2700. The first zip tie 2910 has a first width and a second width. The first width is narrower than the second width and used to attach the first zip tie 2700 to the first base attachment portion. The second width having a length substantially equal to the circumference of the electrical conductor. The electrical conductor (not shown), in one embodiment, includes at least two wires. In another embodiment, the electrical conductor includes three insulated wires covered by a sheath. Such a conductor is available as Romex wiring and is commonly used when wiring in residential construction. In commercial applications the sheath is a cable.

In the claims provided herein, the steps specified to be taken in a claimed method or process may be carried out in any order without departing from the principles of the invention, except when a temporal or operational sequence is explicitly defined by claim language. Recitation in a claim to the effect that first a step is performed, then several other steps are performed, shall be taken to mean that the first step is performed before any of the other steps, but the other steps may be performed in any sequence unless a sequence is further specified within the other steps. For example, claim elements that recite "first A, then B, C, and D, and lastly E" shall be construed to mean step A must be first, step E must be last but steps B, C, and D may be carried out in my sequence between steps A and E and the process of that sequence will still fall within the four corners of the claim.

Furthermore, in the claims provided herein, specified steps may be carried out concurrently unless explicit claim language requires that they be carried out separately or as parts of different processing operations. For example, a claimed step of doing X and a claimed step of doing Y may be conducted simultaneously within a single operation, and the resulting process will be covered by the claim. Thus, a step of doing X, a step of doing Y, and a step of doing Z may be conducted simultaneously within a single process step, or in two separate process steps, or in three separate process steps, and that process will still fall within the four corners of a claim that recites those three steps.

Similarly, except as explicitly required by claim language, a single substance or component may meet more than a single functional requirement, provided that the single substance or component fulfills the more than one functional requirement as specified by claim language.

All patents, patent applications, publications, scientific articles, web sites, and other documents and materials referenced or mentioned herein are indicative of the levels of skill of those skilled in the art to which the invention pertains, and each such referenced document and material is hereby incorporated by reference to the same extent as if it had been incorporated by reference in its entirety individually or set forth herein in its entirety. Additionally, all claims in this application, and all priority applications, including but not limited to original claims, are hereby incorporated in their entirety into, and form a part of, the written description of the invention.

Applicant reserves the right to physically incorporate in to this specification any and all materials and information from any such patents, applications, publications, scientific articles, web sites, electronically available information, and other referenced materials or documents. Applicant reserves the right to physically incorporate into any part of this document, including any part of the written description, the claims referred to above including but not limited to any original claims.

What is claimed is:

1. An electrical box comprising:
   a first side wall with a cut out therein; and
   a second side wall further comprising:
      a first ridge on the exterior portion of the second side wall; and
      a second ridge on the exterior portion of the second side wall; the first ridge substantially parallel to the second ridge, the first ridge and second ridge spaced apart from one another at a distance substantially equal to two sides of the cut out;
   a box mount bracket that slidably engages the cut out on the first side wall of the electrical box, the box mount bracket including a mount which has a mount opening therein;
   a mounting tube mountable to the mount opening, the mounting tube further including
      a first tubular member having a length at least substantially equal to the width of a stud;
      a second member fittable within the first tubular member, the second member further comprising:
         a tubular main body;

a first end including a stop, the first end and stop engaging the mount opening in the box mount bracket;

a second end including a slotted flange, the second end having slots therein that extend through a portion of the slotted flange, the second member passing through the first member, and a portion of the second end outside the tubular main body, the areas between the slots forming at least two bendable fingers that bend to allow the second end to pass through the tubular first member as it is fitted to the first tubular member.

2. The electrical box with a mount of claim 1 wherein the box mount bracket includes a shoulder adapted to abut the stud.

3. The electrical box of claim 2 wherein the mount opening has an axis, the shoulder attached to a free end of the box mount bracket and substantially parallel to the axis of the mount opening, the shoulder adapted to substantially prevent rotation of the side plate.

4. The electrical box of claim 1 wherein the box mount bracket includes at least one retainer tab associated with the mount opening.

5. The electrical box of claim 1 wherein the stop has an outer diameter which is greater than the inner diameter of the mount opening of the box mount bracket.

6. The electrical box of claim 1 wherein the box mount bracket further comprises an anti rotation plate attached to a free end of the box mount bracket, the anti rotation plate substantially perpendicular to a major surface of the box mount bracket, the and adapted to substantially prevent rotation of the box mount bracket.

7. The electrical box of claim 1 wherein the second end of the second member has a diameter that is greater than the outer diameter of the first tubular member.

8. The electrical box of claim 1 wherein the box mount bracket slides with respect to the electrical box, the insulative box including a set of tabs that engage the slide plate at various positions of the slide plate with respect to the insulative box.

9. The electrical box of claim 1 wherein the box mount bracket moves with respect to the electrical box so that the insulative box can be moved to a plurality of positions flush with a finished wall.

10. The electrical box of claim 1 wherein the box mount bracket plate moves with respect to the electrical box, the insulative box including a set of locking tabs that engage the slide plate at one end of its travel.

11. The electrical box of claim 1 wherein the electrical box accommodates a plurality of duplex electrical outlets.

12. The electrical box of claim 1 wherein the electrical box accommodates at least one duplex electrical outlet.

13. The electrical box of claim 1 wherein the first tubular member is made of material that has an exterior surface with a Rockwell Hardness Index in the range of 120 to 200.

* * * * *